US011615763B2

(12) United States Patent
Su et al.

(10) Patent No.: US 11,615,763 B2
(45) Date of Patent: Mar. 28, 2023

(54) COLOR GAMUT COMPRESSION AND EXTENSION

(71) Applicant: Samsung Electronics Co., Ltd., Suwon-si (KR)

(72) Inventors: Chang Su, Foothill Ranch, CA (US); Chenguang Liu, Tustin, CA (US); Pradeep Nagesh, Irvine, CA (US)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/460,009

(22) Filed: Aug. 27, 2021

(65) Prior Publication Data

US 2022/0139355 A1 May 5, 2022

Related U.S. Application Data

(60) Provisional application No. 63/110,056, filed on Nov. 5, 2020.

(51) Int. Cl.
*G09G 5/02* (2006.01)
*G09G 5/06* (2006.01)
(Continued)

(52) U.S. Cl.
CPC ........... *G09G 5/06* (2013.01); *G09G 2340/06* (2013.01)

(58) Field of Classification Search
CPC .. G09G 5/02; G09G 5/06; G09G 5/10; G09G 2320/0271; G09G 2320/0276;
(Continued)

(56) References Cited

U.S. PATENT DOCUMENTS 7,176,935 B2 2/2007 Higgins
9,219,898 B2 12/2015 Doser
(Continued)

FOREIGN PATENT DOCUMENTS

KR 102160485 B1 * 4/2014 ............... G09G 5/02
WO 2019012112 A1 1/2019

OTHER PUBLICATIONS

Sikudova, E. et al., "A gamut-mapping framework for color-accurate reproduction of HDR images", IEEE Computer Graphics and Applications, 2015, pp. 78-90, vo. 36, No. 4, IEEE, United States.
(Continued)

*Primary Examiner* — Wesner Sajous
(74) *Attorney, Agent, or Firm* — Sherman IP LLP; Kenneth L. Sherman; Hemavathy Perumal

(57) ABSTRACT

One embodiment provides a method comprising determining a first representation of a source gamut of an input content in a first two-dimensional (2D) device-independent color space, determining a second representation of a target gamut of a display device in a second 2D device-independent color space, and determining a color transition protection zone (TPZ) based on the source gamut and the target gamut. The method further comprises utilizing a color gamut mapping (CGM) module to perform, based on the TPZ, linear color gamut compression from the first 2D device-independent color space to the second 2D device-independent color space if the target gamut is narrower than the source gamut. The method further comprises utilizing the same CGM module to perform, based on the TPZ, linear color gamut extension from the first 2D device-independent color space to the second 2D device-independent color space if the target gamut is wider than the source gamut.

20 Claims, 27 Drawing Sheets
(Continued)

(3 of 27 Drawing Sheet(s) Filed in Color)

(51) Int. Cl.
*H04N 1/60* (2006.01)
*H04N 9/64* (2006.01)
*H04N 9/69* (2006.01)

(58) Field of Classification Search
CPC ... G09G 2320/0626; G09G 2320/0673; G09G 2340/06; H04N 1/6061; H04N 1/6027; H04N 9/67; H04N 1/60; H04N 1/6002; H04N 1/6041; H04N 1/6058; H04N 1/6052; H04N 5/57; H04N 9/64; H04N 9/646; H04N 9/69; H04N 5/355; H04N 5/2355
See application file for complete search history.

(56) References Cited

U.S. PATENT DOCUMENTS

| | | | | |
|---|---|---|---|---|
| 9,466,260 | B2 | 10/2016 | Higgins | |
| 10,516,810 | B2 | 12/2019 | Hsu et al. | |
| 10,630,867 | B2 | 4/2020 | Su et al. | |
| 2006/0170940 | A1 | 8/2006 | Kang et al. | |
| 2007/0046690 | A1* | 3/2007 | Madden | H04N 9/3132 348/E9.026 |
| 2010/0110312 | A1 | 5/2010 | Muijs et al. | |
| 2010/0272353 | A1* | 10/2010 | Bonnier | H04N 1/6058 382/162 |
| 2012/0013635 | A1* | 1/2012 | Beeman | G09G 5/02 345/590 |
| 2012/0306905 | A1 | 12/2012 | Kim et al. | |
| 2014/0152687 | A1 | 6/2014 | Liu et al. | |
| 2017/0098427 | A1* | 4/2017 | Yamamoto | H04N 9/67 |
| 2018/0293704 | A1* | 10/2018 | Tokizaki | G06T 5/001 |
| 2019/0213974 | A1 | 7/2019 | Marcu et al. | |
| 2019/0325802 | A1 | 10/2019 | Aly | |
| 2020/0092441 | A1 | 3/2020 | Su et al. | |
| 2020/0120318 | A1 | 4/2020 | Stauder et al. | |
| 2020/0258473 | A1 | 8/2020 | Su et al. | |

OTHER PUBLICATIONS

Azimi, M. et al., “A hybrid approach for efficient color gamut mapping”, In 2017 IEEE International Conference on Consumer Electronics (ICCE), Jan. 8, 2017, pp. 254-255, IEEE, United States.
Yang, J. et al., “Development and evaluation of a hybrid point-wise gamut mapping framework”, In 2015 Colour and Visual Computing Symposium (CVCS), Aug. 25, 2015, pp. 1-4, IEEE, United States.
Masaoka, K. et al., “Algorithm design for gamut mapping from UHDTV to HDTV,” Journal of Display Technology, Jul. 7, 2016, pp. 760-769, vol. 12, issue, 7, United States.
Song, G. et al. “A gamut expansion algorithm based on saturation for wide-gamut displays”, In 2010 International Conference on Multimedia Technology, Oct. 29, 2010, pp. 1-3, IEEE, United States.
International Search Report & Written Opinion dated Feb. 3, 2022 for International Application PCT/KR2021/015698 from Korean Intellectual Property Office, pp. 1-8, Republic of Korea.

* cited by examiner

100

200

320

330

340

350

400

510

520

540

540

540

540

560

560

560

560

COLOR GAMUT COMPRESSION AND EXTENSION

CROSS-REFERENCE TO RELATED APPLICATIONS

The present application claims priority to U.S. Provisional Patent Application No. 63/110,056, filed on Nov. 5, 2020, hereby incorporated by reference in its entirety.

TECHNICAL FIELD

One or more embodiments generally relate to color gamut mapping, in particular, a method and system for color gamut compression and extension utilizing a universal framework.

BACKGROUND

Color gamut mapping (CGM), or color gamut transferring (CGT), involves mapping between different color gamuts.

The International Commission on Illumination (CIE) creates international standards related to light and color. In 1931, the CIE created the perceptually non-uniform CIE 1931 XYZ color space, which is an international standard that defines quantitative links between distributions of wavelengths in the electromagnetic visible spectrum and physiologically perceived colors in human color vision. The CIE 1931 xyY color space is derived from CIE 1931 XYZ color space. For expository purposes, the terms "CIE 1931 XYZ color space" and "CIE 1931 xyY color space" are used interchangeably in this specification.

SUMMARY

One embodiment provides a method comprising determining a first representation of a source gamut of an input content in a first two-dimensional (2D) device-independent color space, determining a second representation of a target gamut of a display device in a second 2D device-independent color space, and determining a color transition protection zone (TPZ) based on the source gamut and the target gamut. The method further comprises utilizing a color gamut mapping (CGM) module to perform, based on the TPZ, linear color gamut compression from the first 2D device-independent color space to the second 2D device-independent color space if the target gamut is narrower than the source gamut. The method further comprises utilizing the same CGM module to perform, based on the TPZ, linear color gamut extension from the first 2D device-independent color space to the second 2D device-independent color space if the target gamut is wider than the source gamut.

These and other aspects and advantages of one or more embodiments will become apparent from the following detailed description, which, when taken in conjunction with the drawings, illustrate by way of example the principles of the one or more embodiments.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

For a fuller understanding of the nature and advantages of the embodiments, as well as a preferred mode of use, reference should be made to the following detailed description read in conjunction with the accompanying drawings, in which.

DETAILED DESCRIPTION

Figure 1:
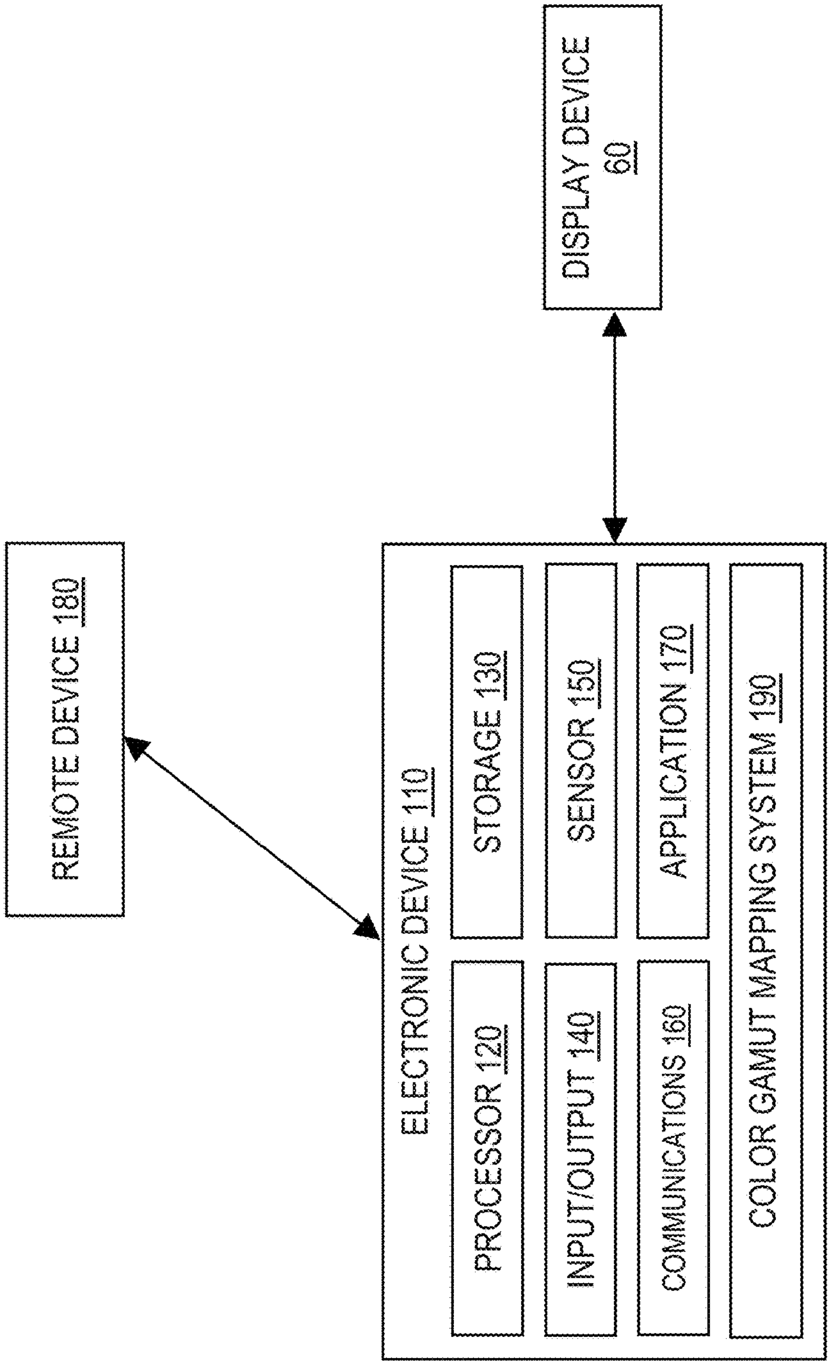
FIG. 1 illustrates an example computing architecture for implementing color gamut mapping of source content for presentation on a display device, in one or more embodiments.

The following description is made for the purpose of illustrating the general principles of one or more embodiments and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

One or more embodiments generally relate to color gamut mapping, in particular, a method and system for color gamut compression and extension utilizing a universal framework. One embodiment provides a method comprising determining a first representation of a source gamut of an input content in a first two-dimensional (2D) device-independent color space, determining a second representation of a target gamut of a display device in a second 2D device-independent color space, and determining a color transition protection zone (TPZ) based on the source gamut and the target gamut. The method further comprises utilizing a color gamut mapping (CGM) module to perform, based on the TPZ, linear color gamut compression from the first 2D device-independent color space to the second 2D device-independent color space if the target gamut is narrower than the source gamut. The method further comprises utilizing the same CGM module to perform, based on the TPZ, linear color gamut extension from the first 2D device-independent color space to the second 2D device-independent color space if the target gamut is wider than the source gamut.

For expository purposes, the terms "color gamut mapping" and "color gamut transferring" are used interchangeably in this specification.

For expository purposes, the terms "source color" and "input color" are used interchangeably in this specification.

Diversity of content in broadcasting and multimedia industries bring great challenges to user-end displays such as television displays (TV displays). For example, color gamut of a TV display is fixed/determined (e.g., DCI-P3), but users tend to watch different content on the TV display. Examples of different content include, but are not limited to, HDR content created by studios, social media or online streaming content, self-made content created/captured by a user-end device (e.g., smart phone), gaming content, etc.

Rec. 2020 (more commonly known by the abbreviation BT.2020) is a standard ratified by the International Telecommunication Union (ITU) that defines various aspects of ultra-high-definition television (UHDTV) with standard dynamic range (SDR) and WCG such as color gamut, frame-rate, color bit-depth, etc. HDR content is typically created with Rec. 2020 which is the widest color gamut in the HDR broadcasting industry. Some social media or online streaming content is created with Rec. 709.

Rec. 709 (more commonly known by the abbreviation BT.709) is a standard ratified by the ITU for image encoding and signal characteristics of high-definition television (HDTV). Some social media or online streaming content is created with Rec. 709 which is a narrow color gamut. Gaming content is typically created with Rec. 709.

Rec. 601 (more commonly known by the abbreviation BT.601) is a standard ratified by the ITU for encoding interlaced analog video signals in digital video form. Some social media or online streaming content is created with Rec. 601 which is the narrowest color gamut.

DCI-P3 is a common RGB color space defined by the Society of Motion Picture and Television Engineers (SMPTE) for digital movie projection from in the film industry. Some social media or online streaming content is created with DCI-P3 which is a wide-color gamut.

Self-made content is created with a color gamut that depends on a user-end device used to create/capture the content.

Color gamut of a user-end display (e.g., TV display) may not match a color gamut of a source content provided to the user-end display for display. For example, a color gamut of a user-end display may be bigger/wider than a color gamut of a source content provided to the user-end display for display. If the color gamut of the user-end display is bigger/wider, all colors in the color gamut of the source content can be reproduced by the user-end display, but not all colors in the color gamut of the user-end display are used in content rendering, which may result in the source content perceptually losing vividness on the user-end display. As another example, a color gamut of a user-end display may be smaller/narrower than a color gamut of a source content provided to the user-end display for display. If the color gamut of the user-end display is smaller/narrower, not all colors in the color gamut of the source content can be correctly reproduced by the user-end display, but not all colors in the color gamut of the user-end display are used in content rendering, such that high visual impacts and artifacts may occur in the rendered content (e.g., clipping banding, scattered spots, hue distortions, and/or oversaturated colors).

Let $\Omega_S$ generally denote a color gamut of source content ("source gamut"), and let $\Omega_T$ generally denote a color gamut of a user-end display device ("target gamut").

In commercial applications, CGM techniques are used to render source content on a user-end display device with a different color gamut than the source content. Conventional techniques for CGM can be classified into two categories. One category of conventional CGM techniques is based on a color appearance model (CAM) and is carried out in uniform color space (e.g., CIELAB, CIELCH, IPT, etc.). CAM-based CGM techniques typically carry out CGM in luminance-chroma (L-C) planes (i.e., brightness-saturation planes) by fixing hue, such that converted colors maintain perceptual color hues, thereby avoiding introducing high visual impacts.

Specifically, a CAM-based CGM technique represents source colors in a source gamut $\Omega_S$ with a perceptually uniform CAM first, then moves an out-of-gamut color (OOGC) in a L-C plane (i.e., brightness-saturation plane), such that colors in resulting output maintain perceptual color hues and keep color continuity along a color gamut boundary (CGB) in the L-C plane. CAM-based CGM techniques need to define color moving constraints (CMCs) from a set of perceptually robust reference constant hue loci that are defined based on rigorous measurements of human subjects' visual responses to color, wherein OOGCs are moved along the CMCs. As a CGB is non-linear in perceptually uniform color space, a large amount of descriptors for the CGB is necessary to achieve accurate colors in resulting output. Therefore, CAM-based CGM techniques require relatively high system resources, thereby increasing system costs. For example, one conventional CAM-based CGM technique requires a 129×129×129 lookup table (LUT) comprising over 2 million CGB descriptors. Additionally, as CGB is non-linear in uniform color space, CAM-based CGM techniques involve complex non-linear computations (e.g., high-order exponential or trigonometric computations) to determine color movement of OOGCs, further increasing system costs. As CAM-based CGM techniques are expensive in hardware implementations, CAM-based CGM techniques are seldom used in common commercial applications/products (e.g., UHDTV).

Another category of conventional CGM techniques is based on a color space conversion (CSC) model and is carried out in the perceptually non-uniform CIE 1931 XYZ color space. Specifically, CSC model-based CGM techniques involve directly converting source colors in a source gamut $\Omega_S$ to corresponding colors in a target gamut $\Omega_T$ that is smaller than the source gamut $\Omega_S$ based on a CSC matrix, followed by clipping OOGCs to boundaries of the target gamut $\Omega_T$ (i.e., color clipping or gamut clipping). As CSC model-based CGM techniques are carried out in non-uniform color space, there is no need to determine uniform color space representations, thereby making CSC model-based CGM techniques cheaper than CAM-based CGM techniques. Further, as a CGB is linear in non-uniform color space, the CGB can be represented by few descriptors. CSC model-based CGM techniques do not require complex non-linear computations to determine color movement of OOGCs (i.e., CSC model-based CGM techniques only utilize linear computations), thereby reducing system costs. However, color clipping may result in small color offsets that lead to perceptible hue distortions and high visual impacts. For example, as OOGCs are always clipped to the boundaries of the target gamut $\Omega_T$, abundant variations in OOGCs are reduced to very few colors or even a single color, resulting in a discontinuity of colors and naturalness in resulting output. The discontinuity of colors may lead to visible banding or spot artifacts in the resulting output, and may generate significant high visual impacts in the output. Therefore, CSC model-based CGM techniques perform poorly in practice compared to CAM-based CGM techniques.

Embodiments of the disclosed technology provide an effective (e.g., efficient) and economic (i.e., low-cost) CGM technique that can be utilized to perform, within a universal framework, either: (1) linear color gamut compression ("gamut compression") to correctly map out-of-gamut colors in a bigger source gamut $\Omega_S$ of source content to corresponding colors in a smaller target gamut $\Omega_T$ of a user-end display using linear computations, or (2) linear color gamut extension ("gamut extension") to map colors in a smaller source gamut $\Omega_S$ of source content to corresponding colors in a bigger target gamut $\Omega_T$ of a user-end display using linear computations, such that colors in the source content do not perceptually lose vividness on the user-end display.

For expository purposes, the terms "gamut extension" and "gamut expansion" are used interchangeably in this specification.

Embodiments of the disclosed technology render artifact-free output (i.e., no visible artifacts and high visual impacts free) in real-time with visually smooth and natural colors (i.e., no perceivable hue distortions) and maintain vividness and naturalness of rendered colors as colors in the source content. Embodiments of the disclosed technology support transferring between source gamuts and target gamuts of different sizes, thereby solving mismatch of color gamuts. Embodiments of the disclosed technology use linear computations, thereby decreasing costs of hardware implementations. Embodiments of the disclosed technology require few system resources and can be implemented in hardware at low costs (e.g., a general chipset). Therefore, embodiments of the disclosed technology are more economic and hardware friendly than the above-described conventional techniques.

Embodiments of the disclosed technology provide on-device/off-device processing which saves costs in hardware. Embodiments of the disclosed technology provide two different and opposite processing methods in the same hardware entity, i.e., color gamut compression and extension, thereby greatly decreasing hardware complexity and costs.

FIG. 1 illustrates an example computing architecture 100 for implementing color gamut mapping of source content for presentation on a display device 60, in one or more embodiments. The computing architecture 100 comprises an electronic device 110 including resources, such as one or more processor units 120 and one or more storage units 130. One or more applications may execute/operate on the electronic device 110 utilizing the resources of the electronic device 110.

In one embodiment, the one or more applications on the electronic device 110 include a color gamut mapping system 190 configured to implement color gamut mapping of source content (e.g., HDR content, etc.) for presentation on a display device 60 integrated in or coupled to the electronic device 110. As described in detail later herein, the color gamut mapping system 190 is configured to: (1) receive source content for presentation on the display device 60, (2) selectively perform one of gamut compression or gamut extension to linearly move/map/transfer some source colors in a source gamut of the source content to target colors in a target gamut of the display device 60, and (3) generate output content including the target colors, wherein the output content is rendered on the display device 60 during the presentation.

Examples of an electronic device 110 include, but are not limited to, a television (e.g., a smart television), a mobile electronic device (e.g., a tablet, a smart phone, a laptop, etc.), a wearable device (e.g., a smart watch, a smart band, a head-mounted display, smart glasses, etc.), a gaming console, a video camera, a media playback device (e.g., a DVD player), a set-top box, an Internet of things (IoT) device, a cable box, a satellite receiver, etc.

In one embodiment, the electronic device 110 comprises one or more sensor units 150 integrated in or coupled to the electronic device 110, such as a camera, a microphone, a GPS, a motion sensor, etc.

In one embodiment, the electronic device 110 comprises one or more I/O units 140 integrated in or coupled to the electronic device 110. In one embodiment, the one or more I/O units 140 include, but are not limited to, a physical user interface (PUI) and/or a GUI, such as a keyboard, a keypad, a touch interface, a touch screen, a knob, a button, a display screen, etc. In one embodiment, a user can utilize at least one I/O unit 140 to configure one or more user preferences, configure one or more parameters, provide input, etc.

In one embodiment, the one or more applications on the electronic device 110 may further include one or more software mobile applications 170 loaded onto or downloaded to the electronic device 110, such as a camera application, a social media application, an online streaming application, etc. A software mobile application 170 on the electronic device 110 may exchange data with the system 190.

In one embodiment, the electronic device 110 comprises a communications unit 160 configured to exchange data with one or more remote devices 180 (e.g., receiving online streaming content from a remote device 180) and/or the display device 60 (e.g., receiving target gamut of the display device 60) over a communications network/connection (e.g., a wireless connection such as a Wi-Fi connection or a cellular data connection, a wired connection, or a combination of the two). The communications unit 160 may comprise any suitable communications circuitry operative to connect to a communications network and to exchange communications operations and media between the electronic device 110 and other devices connected to the same communications network. The communications unit 160 may be operative to interface with a communications network using any suitable communications protocol such as, for example, Wi-Fi (e.g., an IEEE 802.11 protocol), Bluetooth®, high frequency systems (e.g., 900 MHz, 2.4 GHz, and 5.6 GHz communication systems), infrared, GSM, GSM plus EDGE, CDMA, quadband, and other cellular protocols, VOIP, TCP-IP, or any other suitable protocol.

For example, a remote device 180 may comprise a remote server (e.g., a computer, device, or program that manages network resources, etc.) providing a cloud platform for hosting one or more online services (e.g., online streaming service, etc.) and/or distributing one or more software mobile applications 170. As another example, the system 190 may be loaded onto or downloaded to the electronic device 110 from a remote device 180 that maintains and distributes updates for the system 190. As yet another example, a remote device 180 may comprise a cloud computing environment providing shared pools of configurable computing system resources and higher-level cloud computing services.

Figure 2:
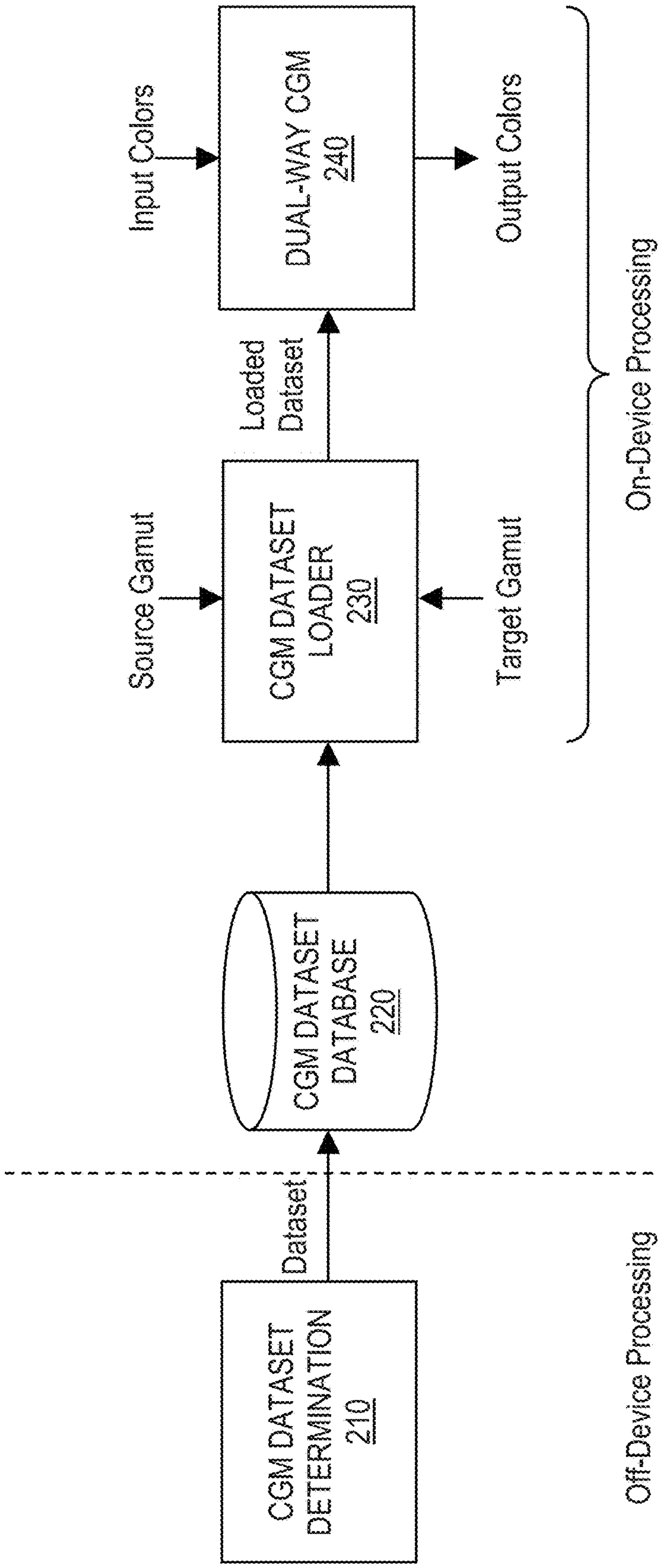
FIG. 2 illustrates an example color gamut mapping system for implementing color gamut mapping of source content for presentation on a display device, in one or more embodiments.

FIG. 2 illustrates an example color gamut mapping system 200 for implementing color gamut mapping of source content for presentation on a display device 60, in one or more embodiments. In one embodiment, the color gamut mapping system 190 in FIG. 1 is implemented as the color gamut mapping system 200. In one embodiment, the system 200 comprises a CGM dataset determination system 210 configured to perform off-device (i.e., offline) processing. In one embodiment, the off-device processing includes determining a CGM dataset required for dual-way color gamut mapping.

In one embodiment, determining, via the determination system 210, a CGM dataset required for dual-way color gamut mapping comprises: (1) determining a first representation of the source gamut in a first two-dimensional device-independent color space by obtaining a first set of gamut boundary descriptors (GBDs) for the source gamut, (2) determining a second representation of the target gamut in a second two-dimensional device-independent color space by obtaining a second set of GBDs for the target gamut, (3) determining a first TPZ for gamut compression with GBDs for the first TPZ, (4) determining a second TPZ for gamut extension with GBDs for the second TPZ, and (5) determining a set of color projecting matrices.

In one embodiment, each of the first two-dimensional device-independent color space and second two-dimensional device-independent color space comprises a perceptually non-uniform CIE 1931 XYZ color space. The first set of GBDs for the source gamut comprises coordinates for different vertices that define one or more boundaries of the source gamut in the first two-dimensional device-independent color space. The second set of GBDs for the target gamut comprises coordinates for different vertices that define one or more boundaries of the target gamut in the second two-dimensional device-independent color space. In one embodiment, each of the first set of GBDs and the second set of GBDs is defined by an international standards organization (e.g., CIE, ITU, SMPTE, etc.).

Each of the first TPZ and the second TPZ defines which source colors (i.e., colors of the source content) that the system 200 needs to move/map/transfer to inside the target gamut, and which remaining source colors that the system 200 does not need to move/map/transfer.

If a source gamut is bigger/wider than a target gamut, conventional systems move/map/transfer source colors that are outside the target gamut to projected counterparts on boundaries of the target gamut, resulting in serious hue distortions and high visual impacts on the display device 60. By comparison, the system 200 provides an effective solution involving gamut compression from the first two-dimensional device-independent color space to the second two-dimensional device-independent color space to achieve a reasonable compromise between source colors that need to be moved and remaining source colors that need to be unchanged. Specifically, as any source color already inside the target gamut can be rendered/displayed well by the display device 60, the system 200 does not move/map/transfer most source colors that are already inside the target gamut, thereby maintaining/protecting original perceptual fidelity of the source colors when displayed/rendered on the display device 60. Further, for each remaining source color either outside the target gamut or inside the target gamut, the system 200 moves/maps/transfers the remaining source color to a target color inside the target gamut in accordance with the first TPZ, thereby maintaining continuity of the source colors and obtaining gamut transferred results that are visually pleasing when displayed/rendered on the display device 60. In one embodiment, the first TPZ for gamut compression maintains perceptual fidelity and color continuity of the source colors.

If a source gamut is smaller/narrower than a target gamut, any source color inside the source gamut can be rendered/displayed well by the display device 60. Source colors can be moved towards boundaries of the target gamut, but this may lead to over-saturation. For example, moving source colors that are very close to the reference white point W may result in visible over-saturation in white/gray colors when the source colors are displayed/rendered on the display device 60. By comparison, the system 200 provides an effective solution involving gamut extension from the first two-dimensional device-independent color space to the second two-dimensional device-independent color space to achieve a reasonable compromise between saturation enhancing and white protection. Specifically, the system 200 moves/maps/transfers only source colors outside the second TPZ. The second TPZ defines a color region where each source color inside the region needs to remain unchanged (i.e., the system 200 does not move/map/transfer source colors inside the second TPZ). In one embodiment, the second TPZ protects perceptually white/gray colors from being over-saturated (i.e., prevents over-saturating white/gray hues).

Each of the first TPZ and second TPZ reduces/prevents high visual impacts caused by color discontinuity near boundaries of the target gamut. Further, as each of the first TPZ and second TPZ constrains color moving paths to a constant hue loci in the working space, each of the first TPZ and second TPZ constrains reduces/prevents significant hue distortions due to unreasonable color moving paths. A constant hue loci is a curve along which each point represents a color belonging to the same hue but with different saturation.

In one embodiment, the set of color projecting matrices comprises: (1) one or more color space conversion matrices, (2) one or more source gamut to TPZ conversion matrices, and (3) one or more other supporting datasets and constants that accelerate computation. Each source gamut to TPZ conversion matrix is a color projecting matrix between the source gamut and a TPZ (e.g., the first TPZ or the second TPZ). In one embodiment, the color space conversion matrices comprise one or more source gamut RGB to CIE 1931 XYZ color space conversion matrices, and one or more CIE 1931 XYZ to target gamut RGB color space conversion matrices.

The determination system 210 prepares feasible and economic datasets that are necessary for dual-way color gamut mapping. In one embodiment, the CGM dataset is a small-size dataset comprising the first set of GBDs for the source gamut, the second set of GBDs for the target gamut, the GBDs for the first TPZ, the GBDs for the second TPZ, and the set of color projecting matrices. In one embodiment, the CGM dataset is a look-up table (LUT).

In one embodiment, the system 200 comprises a CGM dataset database 220 configured to: (1) receive a CGM dataset required for dual-way color gamut mapping (e.g., from the CGM dataset determination unit 210), and (2) maintain the CGM dataset in the database 220. The CGM dataset is registered in the electronic device 110 (i.e., written into a product).

In one embodiment, the system 200 comprises a CGM dataset loader unit 230 and a dual-way CGM system 240 configured to perform on-device (i.e., in-device or online) processing. In one embodiment, the on-device processing includes loading, via the CGM dataset loader unit 230, a CGM dataset suitable for dual-way CGM between the source content and the display device 60. Specifically, the CGM dataset loader unit 230 is configured to: (1) receive source gamut data indicative of the source gamut of the source content, (2) receive target gamut data indicative of the target gamut of the display device 60, and (3) load, from the CGM dataset database 220, the CGM dataset based on the source gamut data and the target gamut data.

In one embodiment, the on-device processing further includes performing, via the dual-way CGM system 240, dual-way CGM. Specifically, the dual-way CGM system 240 is configured to: (1) receive a CGM dataset (e.g., from the CGM dataset loader unit 230), (2) receive input colors in the source gamut, (3) selectively perform one of gamut compression or gamut expansion utilizing the CGM dataset to map at least one input color in the source gamut to at least one target color in the target gamut, and (4) provide output colors in the target gamut to the display device 60 for rendering, wherein the output colors include the at least one target color.

In one embodiment, the dual-way CGM system 240 does not move/map/transfer any source colors that are inside a TPZ. The dual-way CGM system 240 only moves/maps/transfers source colors that are outside of the TPZ. As described in detail later herein, for an input color comprising a source color that is outside of the TPZ, the dual-way CGM system 240 projects the input color to the TPZ to obtain a projected counterpart, determines a color moving path based on the input color and the projected counterpart, determine a source gamut reference point and a target gamut reference point on the color moving path, moves/maps/transfers the input color to a target color in the target gamut along the color moving path, wherein a relative position of the target color between the target gamut reference point and the projected counterpart is the same as a relative position of the input color between the source gamut reference point and the projected counterpart.

Figure 3:
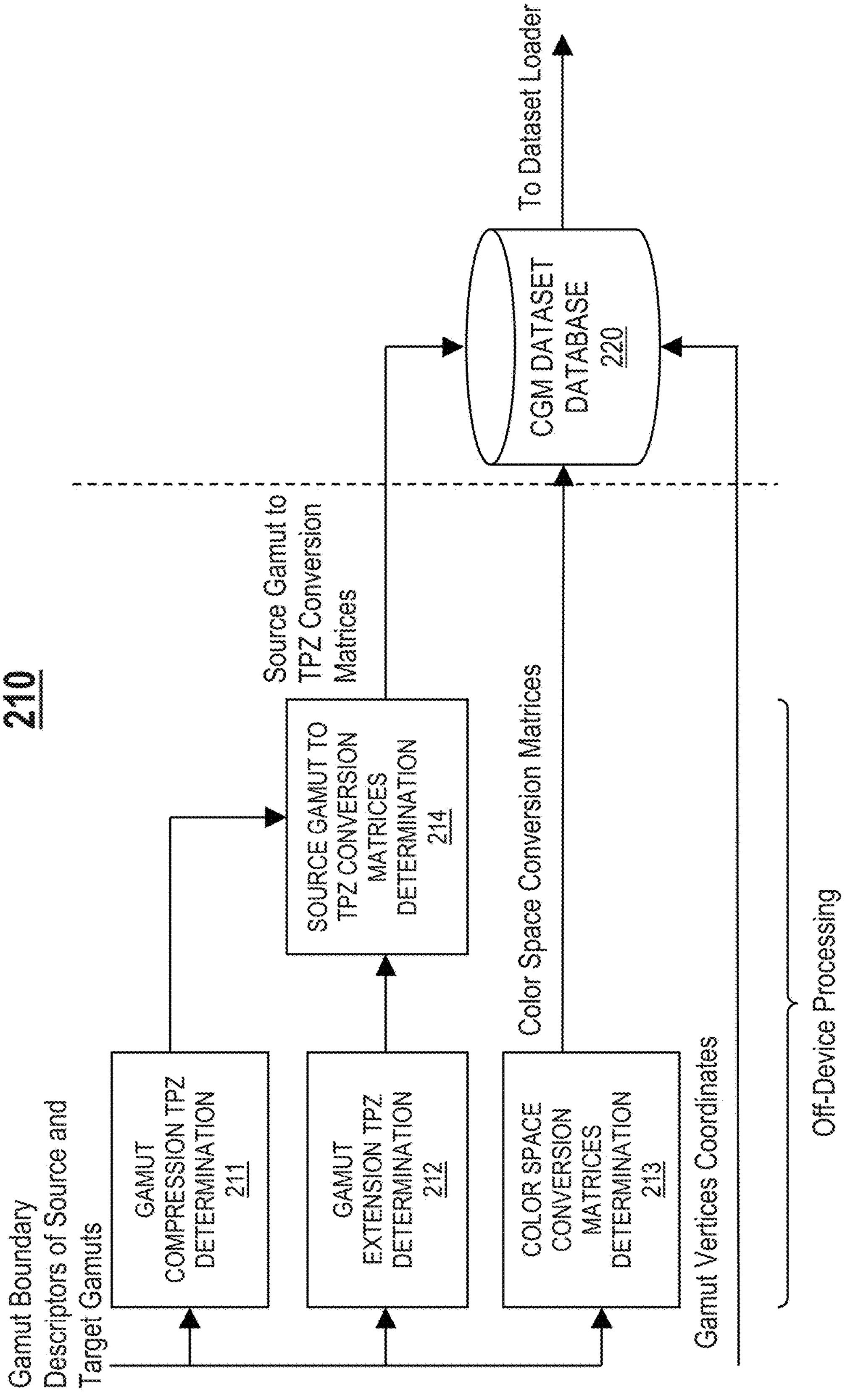
FIG. 3 illustrates an example color gamut mapping (CGM) dataset determination system for off-device processing, in one or more embodiments.

FIG. 3 illustrates an example CGM dataset determination system 210 for off-device processing, in one or more embodiments. In one embodiment, the CGM dataset determination system 210 comprises a gamut compression TPZ determination unit 211 configured to: (1) receive the first set of GBDs for the source gamut and the second set of GBDs for the target gamut, and (2) determine the first TPZ for gamut compression based on the first set of GBDs and the second set of GBDs. Gamut compression involves mapping/transferring some source colors from the first two-dimensional device-independent color space representing the source gamut to target colors in the second two-dimensional device-independent color space representing the target gamut when the source gamut is bigger/wider than the target gamut.

In one embodiment, the CGM dataset determination system 210 comprises a gamut extension TPZ determination unit 212 configured to: (1) receive the first set of GBDs for the source gamut and the second set of GBDs for the target gamut, and (2) determine the second TPZ for gamut extension based on the first set of GBDs and the second set of GBDs. Gamut extension involves mapping/transferring some source colors from the first two-dimensional device-independent color space representing the source gamut to target colors in the second two-dimensional device-independent color space representing the target gamut when the source gamut is smaller/narrower than the target gamut.

In one embodiment, the CGM dataset determination system 210 comprises a color space conversion matrices determination unit 213 configured to: (1) receive the first set of GBDs for the source gamut and the second set of GBDs for the target gamut, (2) determine one or more color space conversion matrices based on the first set of GBDs and the second set of GBDs, and (3) provide the one or more color space conversion matrices to the CGM dataset database 220 for storage.

In one embodiment, the CGM dataset determination system 210 comprises a source gamut to TPZ conversion matrices determination unit 214 configured to: (1) receive the first TPZ for gamut compression (e.g., from the gamut compression TPZ determination unit 211), (2) receive the second TPZ for gamut extension (e.g., from the gamut extension TPZ determination unit 212), (3) determine a first source gamut to TPZ conversion matrix based on coordinates of vertices defining the corresponding boundary of the source gamut, coordinates of vertices defining the corresponding boundary of the first TPZ for gamut compression, and conversion matrix computation rules defined by an international standards organization (e.g., SMPTE), and (4) determine a second source gamut to TPZ conversion matrix based on coordinates of the source gamut and coordinates of the second TPZ, and (5) provide the first source gamut to TPZ conversion matrix and the second source gamut to TPZ conversion matrix to the CGM dataset database 220 for storage.

In one embodiment, the CGM dataset determination system 210 provides the first set of GBDs for the source gamut and the second set of GBDs for the target gamut to the CGM dataset database 220 for storage. In one embodiment, the first set of GBDs for the source gamut comprises coordinates for a red vertex $R_s$ of the source gamut, coordinates for a green vertex $G_s$ of the source gamut, and coordinates for a blue vertex $B_s$ of the source gamut, wherein the vertices $R_s$, $G_s$, and $B_s$ define one or more boundaries of the source gamut. In one embodiment, the second set of GBDs for the target gamut comprises coordinates for a red vertex $R_t$ of the target gamut, coordinates for a green vertex $G_t$ of the target gamut, and coordinates for a blue vertex $B_t$ of the target gamut, wherein the vertices $R_t$, $G_t$, and $B_t$ define one or more boundaries of the target gamut.

Figure 4:
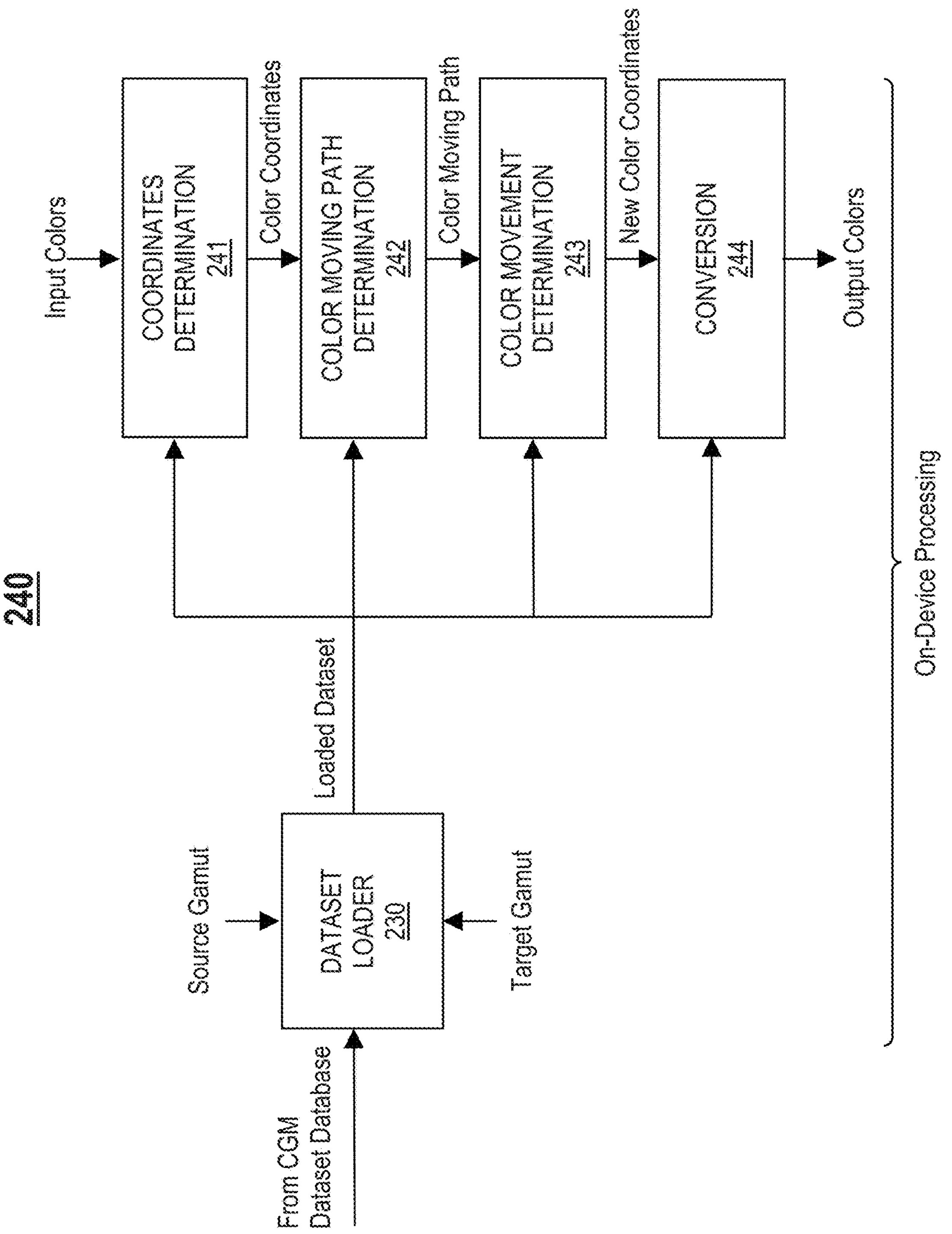
FIG. 4 illustrates an example dual-way CGM system for on-device processing, in one or more embodiments.

FIG. 4 illustrates an example dual-way CGM system 240 for on-device processing, in one or more embodiments. In one embodiment, the dual-way CGM system 240 comprises a coordinates determination unit 241 configured to: (1) receive a CGM dataset (e.g., from the CGM dataset loader unit 230), (2) receive input colors in the source gamut, and (3) for each input color, determine a corresponding representation $c_i$ of the input color in a working space based on the CGM dataset (e.g., at least one color space conversion matrix included in the CGM dataset, such as at least one source gamut RGB to CIE 1931 XYZ color space conversion matrix). For each input color, a corresponding representation $c_i$ comprises coordinates for a vertex representing the input color in the working space. In one embodiment, the working space is a perceptually non-uniform CIE 1931 XYZ color space.

In one embodiment, the dual-way CGM system 240 comprises a color moving path determination unit 242 configured to: (1) receive a CGM dataset (e.g., from the CGM dataset loader unit 230), (2) receive, for an input color in the source gamut, a corresponding representation $c_i$ of the input color in the working space (e.g., from the coordinates determination unit 241), and (3) determine, for the input color, a corresponding color moving path based the CGM dataset (e.g., at least one source gamut to TPZ conversion matrix included in the CGM dataset), wherein a TPZ represented by the CGM dataset constrains the color moving path similar/close to a constant hue loci in the working space. In one embodiment, for an input color in the source gamut, a corresponding color moving path comprises a function that moves/maps/transfers the input color to a target color in the target gamut.

Utilizing CIE 1931 XYZ color space is economical and suitable for commercial applications. As CIE 1931 XYZ color space is perceptually non-uniform, significant hue distortions (e.g., green-red hue shifting) generally result from conventional solutions that utilize CIE 1931 XYZ color space. Other conventional techniques that utilize CAM are very expensive, making such solutions unsuitable for consumer products. By comparison, the system 200 is suitable for consumer products as the consumer products can adopt the economical CIE 1931 XYZ color space without yielding significant hue distortions. Specifically, a TPZ determined by the system 200 (e.g., the first TPZ for gamut compression or the second TPZ for gamut extension) constrains color moving paths similar/close to a constant hue loci in CIE 1931 XYZ color space, resulting in fewer hue distortions.

In one embodiment, the dual-way CGM system 240 comprises a color movement determination unit 243 configured to: (1) receive a CGM dataset (e.g., from the CGM dataset loader unit 230), (2) receive, for an input color in the source gamut, a corresponding color moving path, and (3) move/map/transfer the input color from the representation $c_i$ in the source gamut to a target color $c_o$ in the target gamut along the corresponding color moving path, wherein the target color $c_o$ is a vertex in the working space.

In one embodiment, the dual-way CGM system 240 comprises a conversion unit 244 configured to: (1) receive a CGM dataset (e.g., from the CGM dataset loader unit 230), (2) receive a target color $c_o$ in the target gamut (e.g., from the color movement determination unit 243), (3) convert the target color $c_o$ to a corresponding color (e.g., a RGB color) in a color space of the target gamut based on the CGM dataset (e.g., at least one color space conversion matrix included in the CGM dataset, such as at least one CIE 1931 XYZ to target gamut RGB color space conversion matrices), and (4) provide, to the display device 60, the corresponding color as an output color for rendering/presentation. In one embodiment, the conversion unit 244 converts the target color $c_o$ by determining a representation of the target color in RGB space, wherein the representation of the target color in RGB space comprises RGB values that are provided as the output color.

In one embodiment, the system 200 comprises a CGM dataset loader unit 230 and a dual-way CGM system 240 configured to perform on-device processing. In one embodiment, the on-device processing includes loading, via the CGM dataset loader unit 230, a CGM dataset suitable for dual-way CGM between the source content and the display device 60. Specifically, the CGM dataset loader unit 230 is configured to: (1) receive source gamut data indicative of the source gamut of the source content, (2) receive target data indicative of the target gamut of the display device 60, and (3) load, from the CGM dataset database 220, the CGM dataset based on the source data and the target gamut.

In one embodiment, the dual-way CGM system 240 (including the coordinates determination unit 241, the color moving path determination unit 242, the color movement determination unit 243, and the conversion unit 244) is implemented as a single hardware entity (e.g., fixed hardware code) for both gamut compression and gamut extension, thereby reducing SoC hardware costs.

Figure 5:
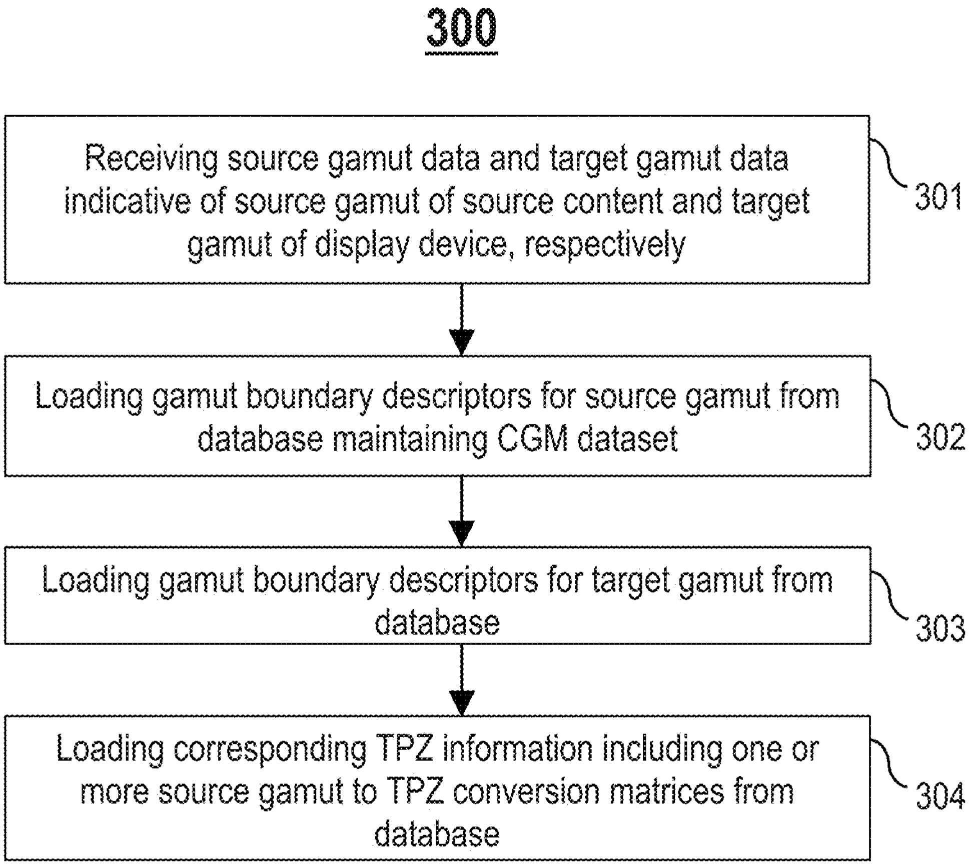
FIG. 5 is a flowchart of an example process for loading a CGM dataset, in one or more embodiments.

FIG. 5 is a flowchart of an example process 300 for loading a CGM dataset, in one or more embodiments. Process block 301 includes receiving source gamut data and target gamut data indicative of source gamut of source content and target gamut of a display device (e.g., display device 60), respectively. Process block 302 includes loading GBDs for the source gamut from a database maintaining a CGM dataset (e.g., CGM dataset database 220). Process block 303 includes loading GBDs for the target gamut from the database. Process 304 includes loading corresponding TPZ information including one or more source gamut to TPZ conversion matrices from the database.

In one embodiment, process blocks 301-304 may be performed by one or more components of the color gamut mapping system 200, such as the CGM dataset loader unit 230.

Figure 6:
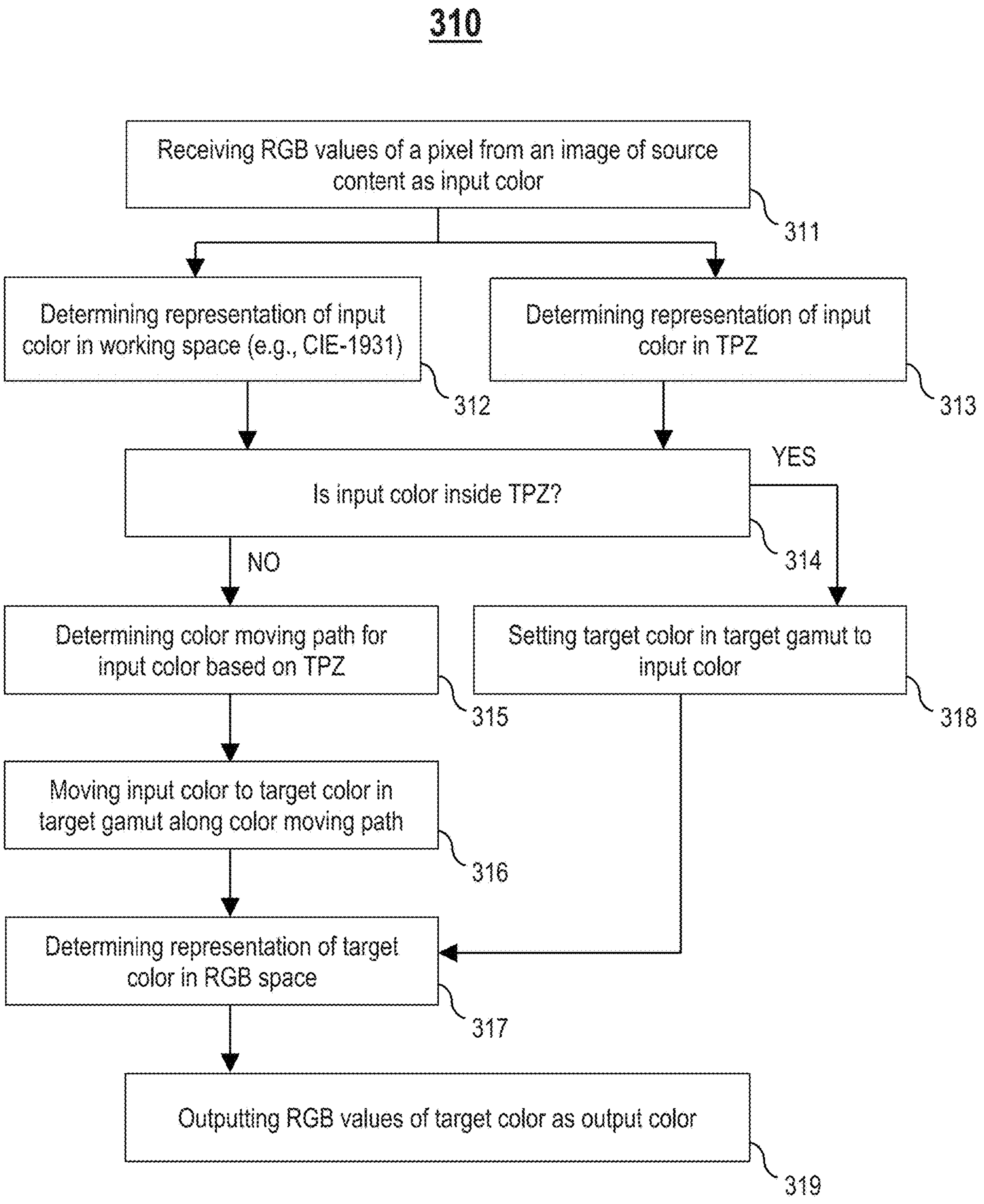
FIG. 6 is a flowchart of an example process for dual-way CGM, in one or more embodiments.

FIG. 6 is a flowchart of an example process 310 for dual-way CGM, in one or more embodiments. Process block 311 includes receiving RGB values of a pixel from an image of source content as input color. Process block 312 includes determining a representation of the input color in a working space (e.g., CIE 1931 XYZ color space). Process block 313 includes determining a representation of the input color in TPZ. Process 314 includes determining whether the input color is inside the TPZ. If the input color is not inside the TPZ, proceed to process block 315. If the input color is inside the TPZ, proceed to process block 318.

Process block 315 includes determining a color moving path for the input color based on the TPZ. Process block 316 includes moving the input color to a target color in target gamut along the color moving path. Process block 317 includes determining a representation of the target color in RGB space (i.e., RGB values of the target color).

Process block 318 includes setting the target color in the target gamut as the input color, then proceed to process block 317.

Process block 319 includes outputting the RGB values of the target color (i.e., the representation of the target color in RGB space) as an output color for rendering/presentation on a display device.

In one embodiment, process blocks 311-319 may be performed by one or more components of the color gamut mapping system 200, such as the coordinates determination unit 241, the color moving path determination unit 242, the color movement determination unit 243, and/or the conversion unit 244.

Figure 7:
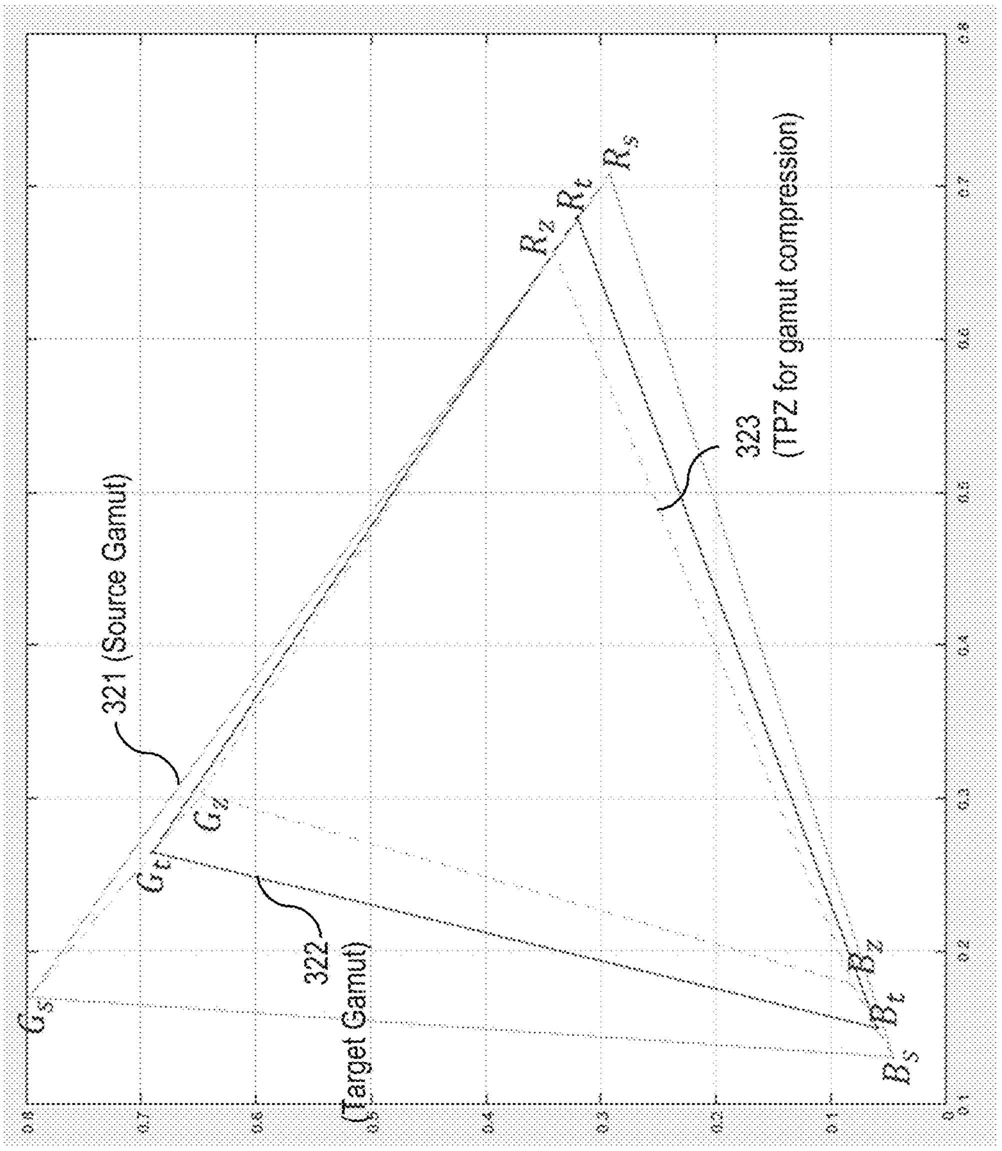
FIG. 7 is a graph illustrating a source gamut in International Commission on Illumination (CIE) 1931 XYZ color space, a target gamut in CIE 1931 XYZ color space, and a transition protection zone (TPZ) for gamut compression, in one or more embodiments.

FIG. 7 is a graph 320 illustrating a source gamut 321 in CIE 1931 XYZ color space, a target gamut 322 in CIE 1931 XYZ color space, and a TPZ 323 for gamut compression, in one or more embodiments. In one embodiment, one or more boundaries of the source gamut 321 are defined by a red vertex $R_s$, a green vertex $G_s$, and a blue vertex $B_s$ (i.e., the boundaries represent the source gamut 321 in a two-dimensional device-independent space). In one embodiment, one or more boundaries of the target gamut 322 are defined by a red vertex $R_t$, a green vertex $G_t$, and a blue vertex $B_t$(i.e., the boundaries represent the target gamut 322 in a two-dimensional device-independent space). If the source gamut 321 is bigger/wider than the target gamut 322 (e.g., the source gamut 321 is Rec. 2020 and the target gamut 322 is DCI-P3), as shown in FIG. 7, the system 200 determines, via the gamut compression TPZ determination unit 211, the TPZ 323 for gamut compression.

In one embodiment, the system 200 determines, via the gamut compression TPZ determination unit 211, a red vertex $R_z$ of the TPZ 323, a green vertex $G_z$ of the TPZ 323, and a blue vertex $B_z$ of the TPZ 323, wherein the vertices $R_z$, $G_z$, and $B_z$ define one or more boundaries for the TPZ 323. The vertices $R_z$, $G_z$, and $B_z$ satisfy a criteria that when an input color outside of the TPZ 323 is color projected to a projected counterpart in the TPZ 323 (e.g., on a corresponding boundary of the TPZ 323), a projection vector for this color projection is similar to a constant hue loci in CIE 1931 XYZ color space. The criteria preserves original perceptual color hue as much as possible, and enables linear color gamut operations including gamut compression and gamut extension.

Specifically, the gamut compression TPZ determination unit 211 determines the red vertex $R_z$ by: (1) determining a distance between a pair of corresponding red vertices $R_s$ and $R_t$, and (2) determining a point on a line extending between the pair of corresponding red vertices $R_s$ and $R_t$ based on a corresponding coefficient $\alpha_R$, wherein the point is set as the red vertex $R_z$. In one embodiment, the x-coordinate $R_z(x)$ and the y-coordinate $R_z(y)$ of the red vertex $R_z$ are determined in accordance with equations (1)-(2) provided below:

$$R_z(x)=R_t(x)+\alpha_R[R_t(x)-R_s(x)] \quad (1), \text{ and}$$

$$R_z(y)=R_t(y)+\alpha_R[R_t(y)-R_s(y)] \quad (2),$$

wherein $R_s(x)$ is the x-coordinate of the red vertex $R_s$, $R_s(y)$ is the y-coordinate of the red vertex $R_s$, $R_t(x)$ is the x-coordinate of the red vertex $R_t$, and $R_t(y)$ is the y-coordinate of the red vertex $R_t$.

The gamut compression TPZ determination unit 211 determines the green vertex $G_z$ by: (1) determining a distance between a pair of corresponding green vertices $G_s$ and $G_t$, and (2) determining a point on a line extending between the pair of corresponding green vertices $G_s$ and $G_t$ based on a corresponding coefficient $\alpha_G$, wherein the point is set as the green vertex $G_z$. In one embodiment, the x-coordinate $G_z(x)$ and the y-coordinate $G_z(y)$ of the green vertex $G_z$ are determined in accordance with equations (3)-(4) provided below:

$$G_z(x)=G_t(x)+\alpha_G[G_t(x)-G_s(x)] \quad (3), \text{ and}$$

$$G_z(y)=G_t(y)+\alpha_G[G_t(y)-G_s(y)] \quad (4),$$

wherein $G_s(x)$ is the x-coordinate of the green vertex $G_s$, $G_s(y)$ is the y-coordinate of the green vertex $G_s$, $G_t(x)$ is the x-coordinate of the green vertex $G_t$, and $G_t(y)$ is the y-coordinate of the green vertex $G_t$.

The gamut compression TPZ determination unit 211 determines the blue vertex $B_z$ by: (1) determining a distance between a pair of corresponding blue vertices $B_s$ and $B_t$, and (2) determining a point on a line extending between the pair of corresponding blue vertices $B_s$ and $B_t$ based on a corresponding coefficient $\alpha_B$, wherein the point is set as the blue vertex $B_z$. In one embodiment, the x-coordinate $B_z(x)$ and the y-coordinate (y) of the blue vertex $B_z$ are determined in accordance with equations (5)-(6) provided below:

$$B_z(x)=B_t(x)+\alpha_B[B_t(x)-B_s(x)] \quad (5), \text{ and}$$

$$B_z(y)=B_t(y)+\alpha_B[B_t(y)-B_s(y)] \quad (6),$$

wherein $B_s(x)$ is the x-coordinate of the blue vertex $B_s$, $B_s(y)$ is the y-coordinate of the blue vertex $B_s$, $B_t(x)$ is the x-coordinate of the blue vertex $B_t$, and $B_t(y)$ is the y-coordinate of the blue vertex $B_t$.

Each coefficient $\alpha_R$, $\alpha_G$, and $\alpha_B$ is a size factor used to determine/adjust a size of the TPZ 323. In one embodiment, the coefficients $\alpha_R$, $\alpha_G$, and $\alpha_B$ are experimentally determined.

Figure 8:
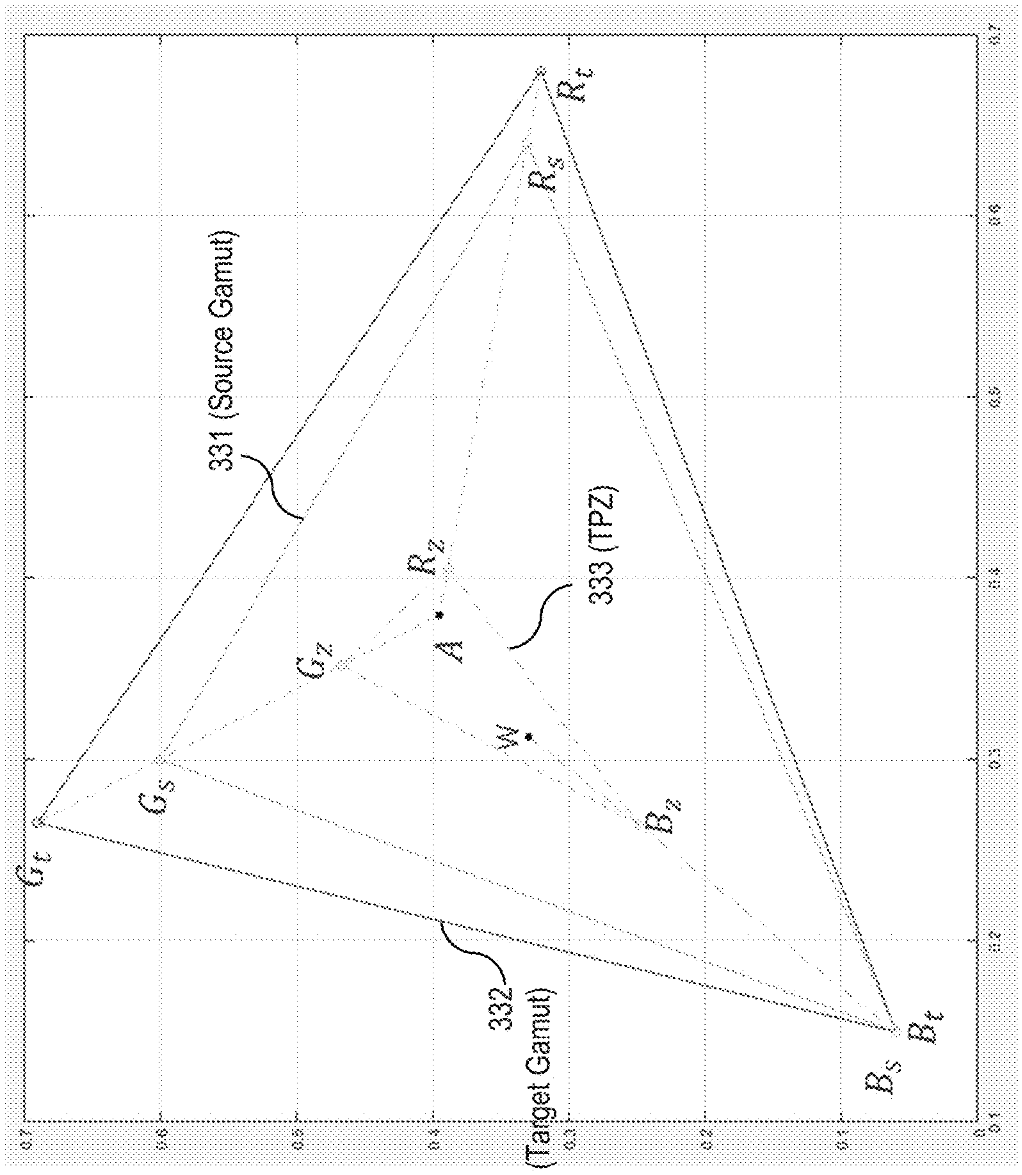
FIG. 8 is a graph illustrating a source gamut in CIE 1931 XYZ color space, a target gamut in CIE 1931 XYZ color space, and a TPZ for gamut extension, in one or more embodiments.

FIG. 8 is a graph 330 illustrating a source gamut 331 in CIE 1931 XYZ color space, a target gamut 332 in CIE 1931 XYZ color space, and a TPZ 333 for gamut extension, in one or more embodiments. In one embodiment, one or more boundaries of the source gamut 331 are defined by a red vertex $R_s$, a green vertex $G_s$, and a blue vertex $B_s$ (i.e., the boundaries represent the source gamut 331 in a two-dimensional device-independent space). In one embodiment, one or more boundaries of the target gamut 332 are defined by a red vertex $R_t$, a green vertex $G_t$, and a blue vertex $B_t$(i.e., the boundaries represent the target gamut 332 in a two-dimensional device-independent space). If the source gamut 331 is smaller/narrower than the target gamut 332 (e.g., the source gamut 331 is DCI-P3 and the target gamut 332 is Rec. 709), as shown in FIG. 8, the system 200 determines, via the gamut extension TPZ determination unit 212, the TPZ 333 for gamut extension.

In one embodiment, the system 200 determines, via the gamut extension TPZ determination unit 212, a red vertex $R_z$ of the TPZ 333, a green vertex $G_z$ of the TPZ 333, and a blue vertex $B_z$ of the TPZ 333, wherein the vertices $R_z$, $G_z$, and $B_z$ define one or more boundaries for the TPZ 333. The vertices $R_z$, $G_z$, and $B_z$ satisfy the criteria that when an input color outside of the TPZ 333 is color projected to a projected counterpart in the TPZ 333 (e.g., on a corresponding boundary of the TPZ 333), a projection vector for this color projection is similar to a constant hue loci in CIE 1931 XYZ color space, thereby preserving original perceptual color hue as much as possible.

Specifically, the gamut extension TPZ determination unit 212 determines the red vertex $R_z$ by: (1) determining an intersection of a line $\overline{R_sR_t}$ extending between a pair of corresponding red vertices $R_s$ and $R_t$ and another line extending between a different pair of corresponding vertices, such as line $\overline{G_tG_s}$ extending between a pair of corresponding red vertices $G_s$ and $G_t$, wherein the intersection is set as a reference anchor A, and (2) determining a point on the line $\overline{R_sR_t}$ based on a corresponding coefficient $\alpha_R$ and the reference anchor A, wherein the point is set as the red vertex $R_z$. In one embodiment, the x-coordinate $R_z(x)$ and the y-coordinate $R_z(y)$ of the red vertex $R_z$ are determined in accordance with equations (7)-(8) provided below:

$$R_z(x)=A(x)+\alpha_R[R_s(x)-A(x)] \quad (7), \text{ and}$$

$$R_z(y)=A(y)+\alpha_R[R_s(y)-A(y)] \quad (8),$$

wherein $R_s(x)$ is the x-coordinate of the red vertex $R_s$, $R_s(y)$ is the y-coordinate of the red vertex $R_s$, A(x) is the x-coordinate of the reference anchor A, and A(y) is the y-coordinate of the reference anchor A.

The gamut extension TPZ determination unit 212 determines the green vertex $G_z$ by: (1) determining an intersection of a line $\overline{G_sG_t}$ extending between the pair of corresponding green vertices $G_s$ and $G_t$ and another line extending between a different pair of corresponding vertices, such as line $\overline{R_tR_s}$ extending between the pair of corresponding red vertices $R_s$ and $R_t$, wherein the intersection is set as the reference anchor A, and (2) determining a point on the line $\overline{G_sG_t}$ based on a corresponding coefficient $\alpha_G$ and the reference anchor A, wherein the point is set as the green vertex $G_z$. In one embodiment, the x-coordinate $G_z(x)$ and the y-coordinate $G_z(y)$ of the green vertex $G_z$ are determined in accordance with equations (9)-(10) provided below:

$$G_z(x)=A(x)+\alpha_G[G_s(x)-A(x)] \quad (9), \text{ and}$$

$$G_z(y)=A(y)+\alpha_G[G_s(y)-A(y)] \quad (10),$$

wherein $G_s(x)$ is the x-coordinate of the green vertex $G_s$, and $G_s(y)$ is the y-coordinate of the green vertex $G_s$.

The gamut extension TPZ determination unit 212 determines the blue vertex $B_z$ by: (1) determining an intersection of a line $\overline{B_sB_t}$ extending between the pair of corresponding blue vertices $B_s$ and $B_t$ and another line extending between a different pair of corresponding vertices, such as line $\overline{R_tR_s}$ extending between the pair of corresponding red vertices $R_s$ and $R_t$, wherein the intersection is set as the reference anchor A, and (2) determining a point on the line $\overline{B_sB_t}$ based on a corresponding coefficient $\alpha_B$ and the reference anchor A, wherein the point is set as the blue vertex $B_z$. In one embodiment, the x-coordinate $B_z(x)$ and the y-coordinate $B_z(y)$ of the blue vertex $B_z$ are determined in accordance with equations (11)-(12) provided below:

$$B_z(x)=A(x)+\alpha_B[B_s(x)-A(x)] \quad (11), \text{ and}$$

$$B_z(y)=A(y)+\alpha_B[B_s(y)-A(y)] \quad (12),$$

wherein $B_s(x)$ is the x-coordinate of the blue vertex $B_s$, and $B_s(y)$ is the y-coordinate of the blue vertex $B_s$.

In one embodiment, if any pair of corresponding vertices share the same coordinates, the gamut extension TPZ determination unit 212 replaces the reference anchor A with a reference white point W instead when determining a corresponding vertex of the TPZ 333. For example, if the blue vertices $B_s$ and $B_t$ share the same coordinates, as shown in FIG. 8, the gamut extension TPZ determination unit 212 replaces the reference anchor A with the reference white point W in equations (11)-(12) provided above.

Each coefficient $\alpha_R$, $\alpha_G$, and $\alpha_B$ for gamut extension is a size factor used to determine/adjust a size of the TPZ 333. In one embodiment, the coefficients $\alpha_R$, $\alpha_G$, and $\alpha_B$ for gamut extension are experimentally determined.

Figure 9:
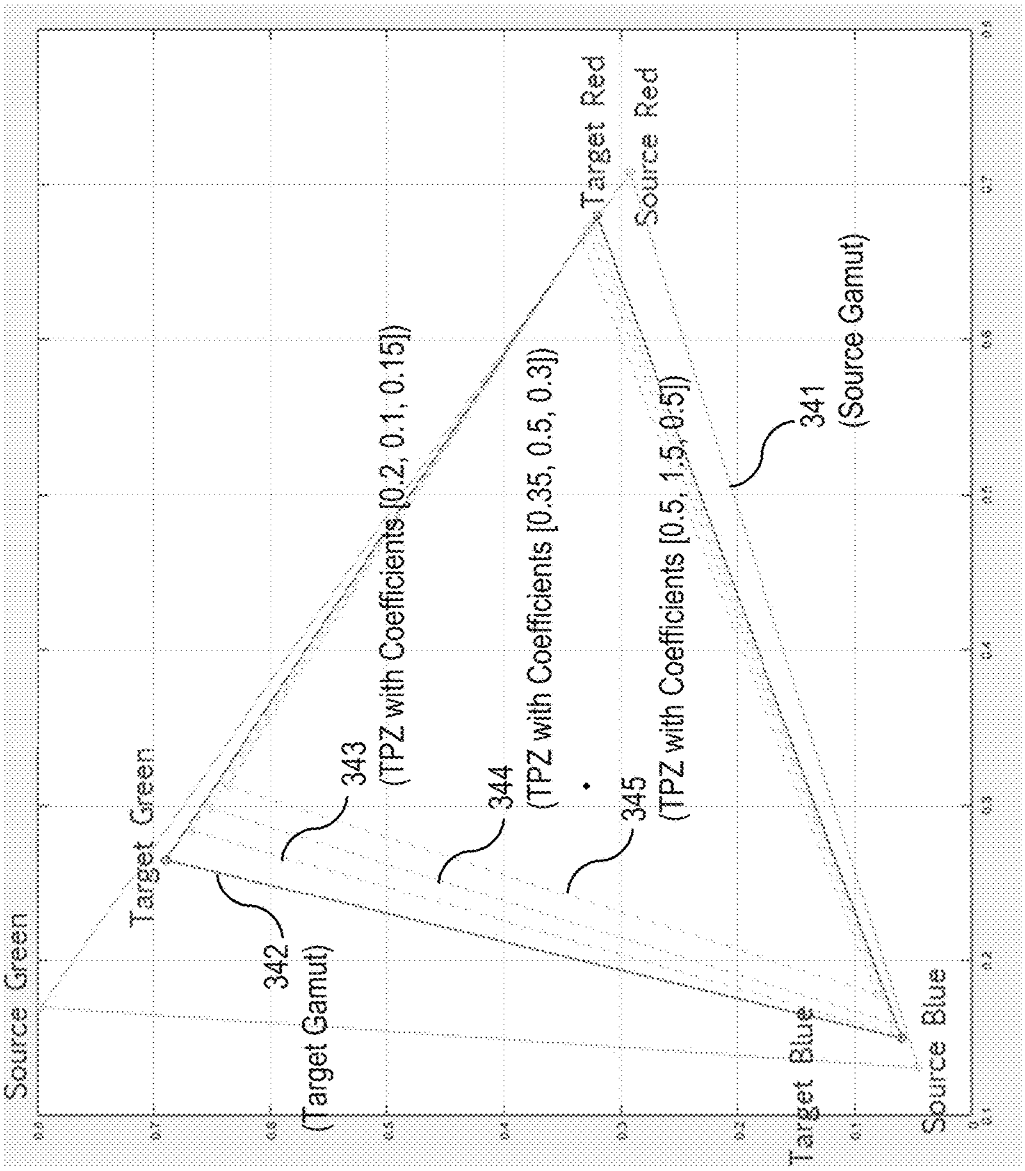
FIG. 9 is a graph illustrating a source gamut in CIE 1931 XYZ color space, a target gamut in CIE 1931 XYZ color space, and different TPZs with different coefficients for gamut compression, in one or more embodiments.

FIG. 9 is a graph 340 illustrating a source gamut 341 in CIE 1931 XYZ color space, a target gamut 342 in CIE 1931 XYZ color space, and different TPZs 343, 344, and 345 with different coefficients for gamut compression, in one or more embodiments. In one embodiment, one or more boundaries of the source gamut 341 are defined by a red vertex Source Red, a green vertex Source Green, and a blue vertex Source Blue. In one embodiment, one or more boundaries of the target gamut 342 are defined by a red vertex Target Red, a green vertex Target Green, and a blue vertex Target Blue. If the source gamut 341 is bigger/wider than the target gamut 342 (e.g., the source gamut 341 is Rec. 2020 and the target gamut 342 is DCI-P3), as shown in FIG. 9, a size of a TPZ for gamut compression is based on the coefficients $\alpha_R$, $\alpha_G$, and $\alpha_B$ for gamut compression. In one embodiment, the size of the TPZ for gamut compression achieves an optimum compromise between image details protection and preservation of saturation and color contrast.

For example, if the set of coefficients [$\alpha_R$, $\alpha_G$, $\alpha_B$] is set to [0.2, 0.1, 0.15] (i.e., $\alpha_R$=0.2, $\alpha_G$=0.1, and $\alpha_B$=0.15), the system 200 determines, via the gamut compression TPZ determination unit 211, the TPZ 343 inside the target gamut 342.

As another example, if the set of coefficients [$\alpha_R$, $\alpha_G$, $\alpha_B$] is set to [0.35, 0.5, 0.3] (i.e., $\alpha_R$=0.35, $\alpha_G$=0.5, and $\alpha_B$=0.3), the system 200 determines, via the gamut compression TPZ determination unit 211, the TPZ 344 inside the target gamut 342.

As yet another example, if the set of coefficients [$\alpha_R$, $\alpha_G$, $\alpha_B$] is set to [0.5, 1.5, 0.5] (i.e., $\alpha_R$=0.5, $\alpha_G$=1.5, and $\alpha_B$=0.5), the system 200 determines, via the gamut compression TPZ determination unit 211, the TPZ 345 inside the target gamut 342.

Figure 10:
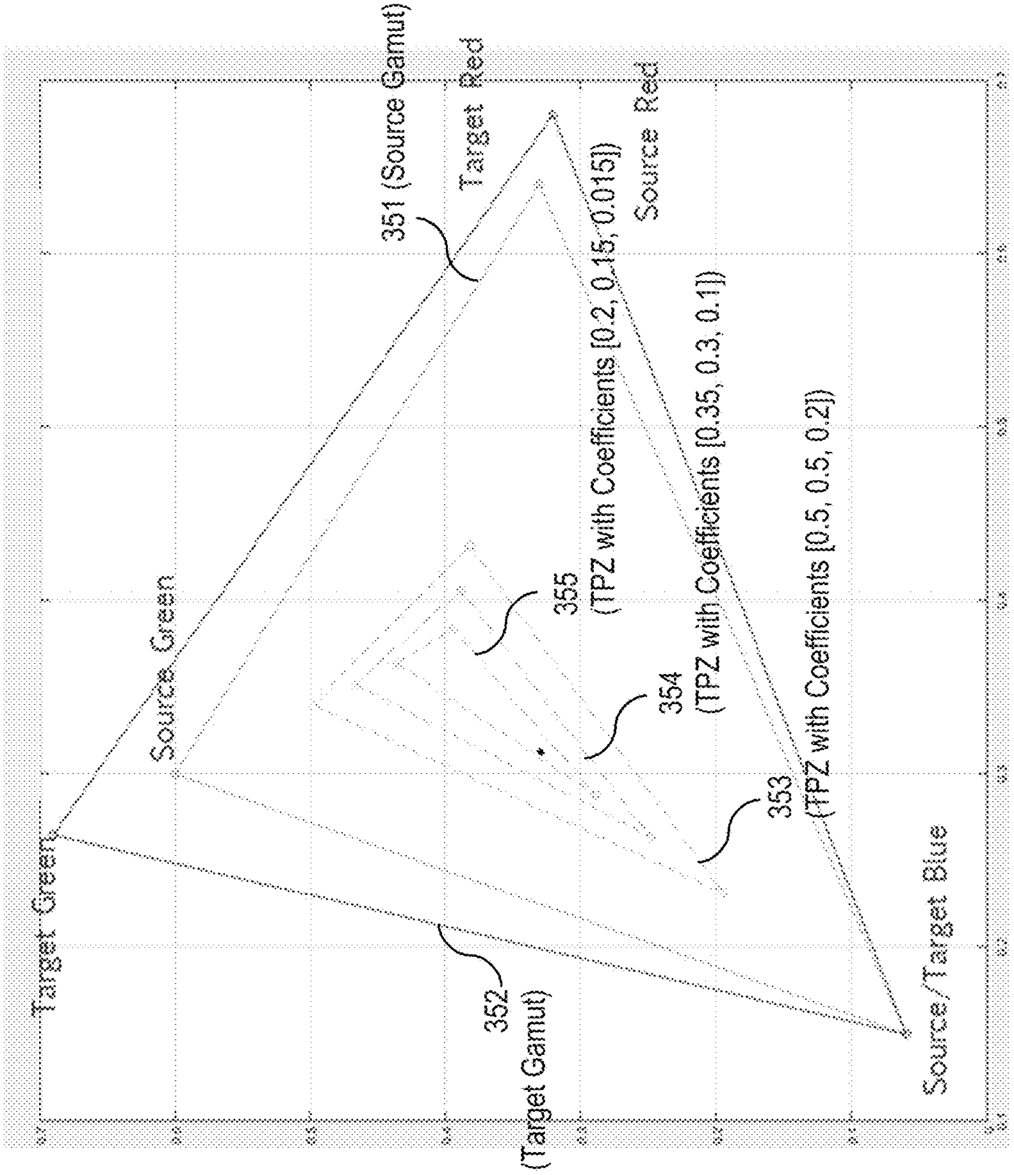
FIG. 10 is a graph illustrating a source gamut in CIE 1931 XYZ color space, a target gamut in CIE 1931 XYZ color space, and different TPZs with different coefficients for gamut extension, in one or more embodiments.

FIG. 10 is a graph 350 illustrating a source gamut 351 in CIE 1931 XYZ color space, a target gamut 352 in CIE 1931 XYZ color space, and different TPZs 353, 354, and 355 with different coefficients for gamut extension, in one or more embodiments. In one embodiment, one or more boundaries of the source gamut 351 are defined by a red vertex Source Red, a green vertex Source Green, and a blue vertex Source Blue. In one embodiment, one or more boundaries of the target gamut 352 are defined by a red vertex Target Red, a green vertex Target Green, and a blue vertex Target Blue. If the source gamut 351 is smaller/narrower than the target gamut 352 (e.g., the source gamut 351 is DCI-P3 and the target gamut 352 is Rec. 709), as shown in FIG. 10, a size of a TPZ for gamut extension is based on the coefficients $\alpha_R$, $\alpha_G$, and $\alpha_B$ for gamut extension. In one embodiment, the size of the TPZ for gamut extension achieves an optimum compromise between image details protection and preservation of saturation and color contrast.

For example, if the set of coefficients $[\alpha_R, \alpha_G, \alpha_B]$ is set to [0.5, 0.5, 0.2] (i.e., $\alpha_R=0.5$, $\alpha_G=0.5$, and $\alpha_B=0.2$), the system 200 determines, via the gamut extension TPZ determination unit 212, the TPZ 353 inside the source gamut 351.

As another example, if the set of coefficients $[\alpha_R, \alpha_G, \alpha_B]$ is set to [0.35, 0.3, 0.1] (i.e., $\alpha_R=0.35$, $\alpha_G=0.3$, and $\alpha_B=0.1$), the system 200 determines, via the gamut extension TPZ determination unit 212, the TPZ 354 inside the source gamut 351.

As yet another example, if the set of coefficients $[\alpha_R, \alpha_G, \alpha_B]$ is set to [0.2, 0.15, 0.015] (i.e., $\alpha_R=0.2$, $\alpha_G=0.15$, and $\alpha_B=0.015$), the system 200 determines, via the gamut extension TPZ determination unit 212, the TPZ 355 inside the source gamut 351.

Figure 11:
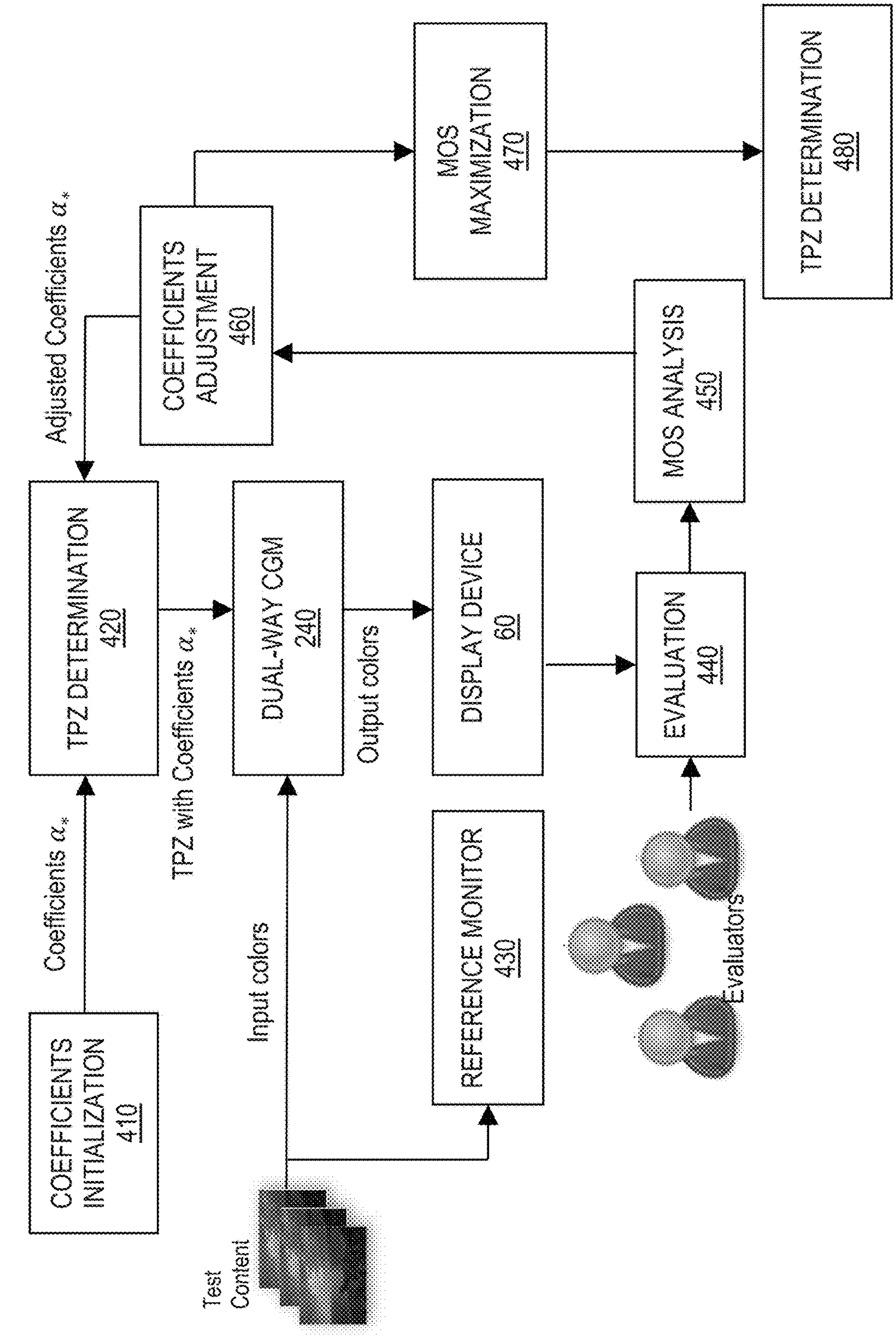
FIG. 11 illustrates an example coefficients development system, in one or more embodiments.

FIG. 11 illustrates an example coefficients development system 400, in one or more embodiments. In one embodiment, the coefficients development system 400 is utilized to experimentally determine coefficients $\alpha_R$, $\alpha_G$, and $\alpha_B$. Let $\alpha_*$ generally denote a set of coefficients comprising $\alpha_R$, $\alpha_G$, and $\alpha_B$.

In one embodiment, the coefficients development system 400 comprises: (1) a reference monitor 430 deployed in an environment including one or more evaluators (i.e., reviewers), (2) a display device 60 deployed in the same environment, (3) a coefficients initialization unit 410 configured to initialize the set of coefficients $\alpha_*$, (4) a TPZ determination unit 420 configured to determine a TPZ with the set of coefficients $\alpha_*$, (5) the dual-way CGM system 240 configured to selectively perform one of gamut compression or gamut expansion utilizing the TPZ, (6) an evaluation unit 440 configured to receive an evaluation from each evaluator, (7) a mean opinion score (MOS) analysis unit 450 configured to perform an analysis based on each evaluation from each evaluator, and (8) a coefficients adjustment unit 460 configured to adjust the set of coefficients $\alpha_*$ based on the analysis.

In one embodiment, the development of the set of coefficients $\alpha_*$ involves initializing, via the coefficients initialization unit 410, the set of coefficients $\alpha_*$ to [0.1, 0.1, 0.1]. The development of the set of coefficients $\alpha_*$ further involves an iterative process comprising the following steps: (1) determining, via the TPZ determination unit 420, a TPZ based on the initialized set of coefficients $\alpha_*$, (2) displaying test content comprising one or more images of a source content on the reference monitor 430 for the evaluators to view, (3) selectively performing, via the dual-way CGM system 240, one of gamut compression or gamut expansion utilizing the TPZ to move/map/transfer at least one input colors in a source gamut of the source content to at least one target color in a target gamut of the display device 60, (4) displaying gamut transferred results by displaying one or more images comprising output colors from the dual-way CGM system 240 on the display device 60 for the evaluators view, (5) each evaluator comparing the images displayed on the reference monitor 430 against the images displayed on the display device 60, and providing an evaluation, via the evaluation unit 440, of the gamut transferred results, (6) performing, via the MOS analysis unit 450, an analysis based on each evaluation from each evaluator, and (7) adjusting, via the coefficients adjustment unit 460, the set of coefficients $\alpha_*$ based on the analysis. The iterative process repeats by determining, via the TPZ determination unit 420, an adjusted TPZ based on the adjusted set of coefficients $\alpha_*$.

In one embodiment, each evaluation provided by each evaluator comprises the evaluator's responses to a form. For example, in one embodiment, the form comprises questions asking an evaluator to provide opinion scores evaluating the gamut transferred results based on criteria such as: (1) level of artifacts on a scale from 1 to 5, where an opinion score of 1 is unacceptable and an opinion score of 5 is excellent, (2) level of visual smoothness and naturalness on a scale from 1 to 5, where an opinion score of 1 is very bad and an opinion score of 5 is excellent, (3) level of hue distortions on a scale from 1 to 5, where an opinion score of 1 is unacceptable and an opinion score of 5 is excellent, (4) level of comfort with color saturation on a scale of 1 to 5, wherein an opinion score of 1 is very high visual impacts and an opinion score of 5 is visually pleasing, and (5) overall harmony of colors on a scale of 1 to 5, where an opinion score of 1 is very bad and an opinion score of 5 is very good. In one embodiment, the MOS analysis unit 450 is configured to perform an aggregation of opinion scores across all evaluations from the evaluators, and determine a MOS (mean opinion score) based on the aggregation.

In one embodiment, the coefficients development system 400 further comprises: (1) a MOS maximization unit 470 configured to determine the set of coefficients $\alpha_*$ that yielded a maximum MOS, and (2) a TPZ determination unit 480 configured to determine a TPZ with the set of coefficients $\alpha_*$ that yielded the maximum MOS. In one embodiment, the gamut compression TPZ determination unit 211 is configured to determine a TPZ for gamut compression with the set of coefficients $\alpha_*$ that yielded the maximum MOS. In one embodiment, the gamut extension TPZ determination unit 212 is configured to determine a TPZ for gamut extension with the set of coefficients $\alpha_*$ that yielded the maximum MOS.

In one embodiment, a manufacturer of a display device 60 (e.g., a TV manufacturer) defines a TPZ for their display device 60 based on experiments. In one embodiment, a TPZ is defined in a standard.

Figure 12:
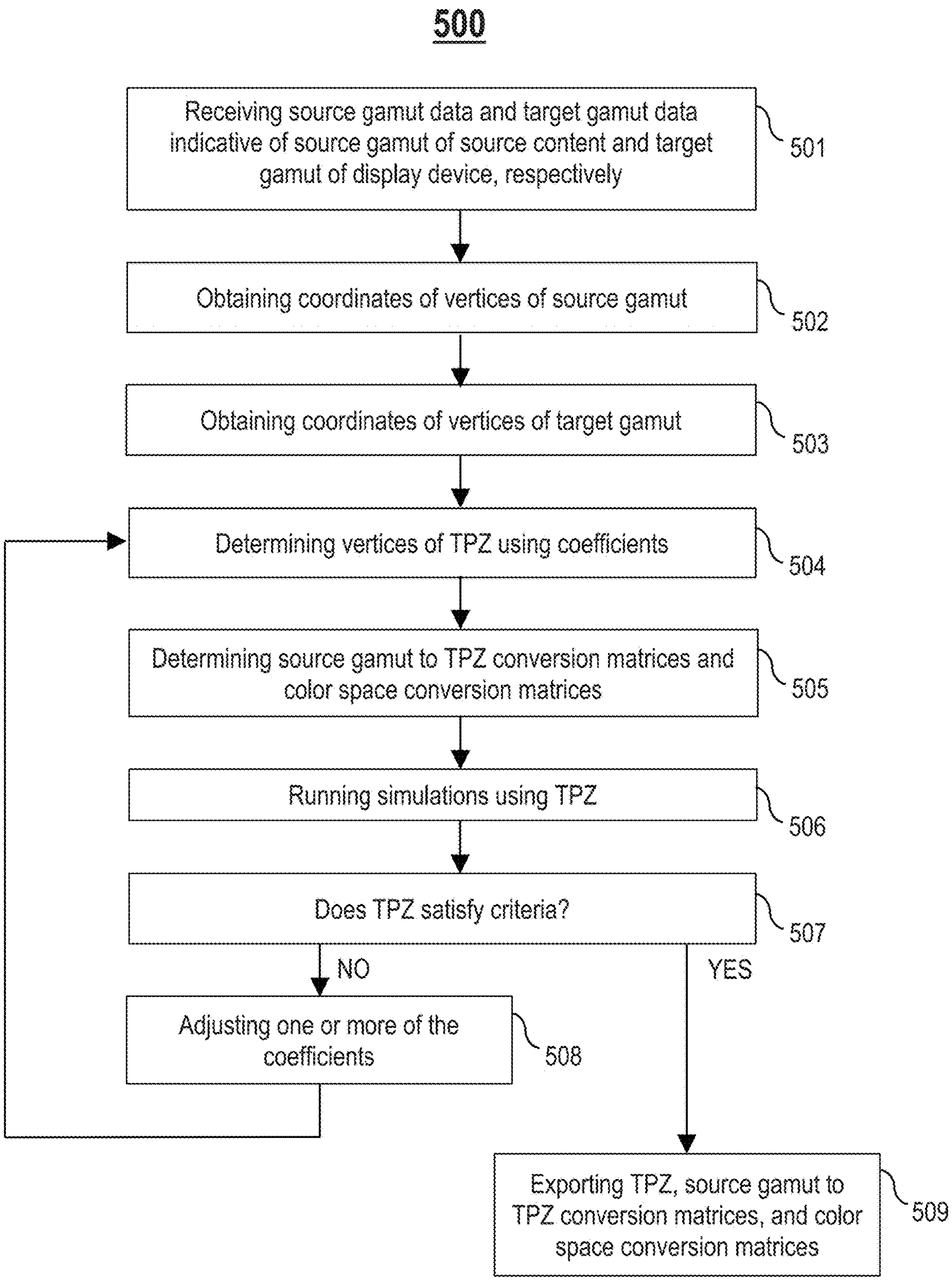
FIG. 12 is a flowchart of an example process for experimentally determining a set of coefficients, in one or more embodiments.

FIG. 12 is a flowchart of an example process 500 for experimentally determining a set of coefficients $\alpha_*$, in one or more embodiments. Process block 501 includes receiving source gamut data and target gamut data indicative of a source gamut of a source content and target gamut of a display device (e.g., display device 60), respectively. Process block 502 includes obtaining coordinates of vertices (e.g., vertices $R_s$, $G_s$, and $B_s$) of the source gamut (e.g., from gamut boundary descriptors for the source gamut included in the source gamut data). Process block 503 includes obtaining coordinates of vertices (e.g., vertices $R_t$, $G_t$, and $B_t$) of the target gamut (e.g., from gamut boundary descriptors for the target gamut included in the target gamut data). Process block 503 includes obtaining coordinates of vertices (e.g., vertices $R_t$, $G_t$, and $B_t$) of the target gamut (e.g., from gamut boundary descriptors for the target gamut included in the target gamut data).

Process block 504 is the start of an iterative process. Process block 504 includes determining vertices (e.g., vertices $R_z$, $G_z$, and $B_z$) of a TPZ with a set of coefficients $\alpha_*$ (e.g., at the start of the iterative process, an initialized set of coefficients $\alpha_*$, such as [0.1, 0.1., 0.1]; for each subsequent iteration, an adjusted set of coefficients $\alpha_*$,). In one embodiment, if the source gamut is bigger/wider than the target gamut, the vertices of the TPZ are determined in accordance with equations (1)-(6) provided above for gamut compression. If the source gamut is smaller/narrower than the target gamut, the vertices of the TPZ are determined in accordance with equations (7)-(12) provided above for gamut extension.

Process block 505 includes determining source gamut to TPZ conversion matrices and color space conversion matrices (e.g., one or more source gamut RGB to CIE 1931 XYZ color space conversion matrices, and one or more CIE 1931 XYZ to target gamut RGB color space conversion matrices).

Process block 506 includes running simulations using the TPZ. In one embodiment, the simulations include displaying test content comprising one or more images of a source content on a reference monitor (e.g., reference monitor 430) for evaluators to view, displaying one or more images comprising output colors generated using the TPZ (e.g., via the dual-way CGM system 240) on a display device (e.g., display device 60) for the evaluators view, the evaluators comparing the images displayed on the reference monitor against the images displayed on the display device, and the evaluators providing evaluations of the images displayed on the display device.

Process block 507 includes determining whether the TPZ satisfies criteria. In one embodiment, each evaluator provides opinion scores evaluating the images displayed on the display device based on criteria included in a form. If the TPZ does not satisfy the criteria, proceed to process block 508. If the TPZ satisfies the criteria, proceed to process block 509.

Process block 508 includes adjusting one or more coefficients of the set of coefficients $\alpha_*$, and returning to process block 504 for another iteration of the process.

Process block 509 includes exporting the TPZ, the source gamut to TPZ conversion matrices, and the color space conversion matrices as CGM dataset.

In one embodiment, process blocks 501-509 may be performed by one or more components of the color gamut mapping system 200 and/or the coefficients development system 400.

Figure 13:
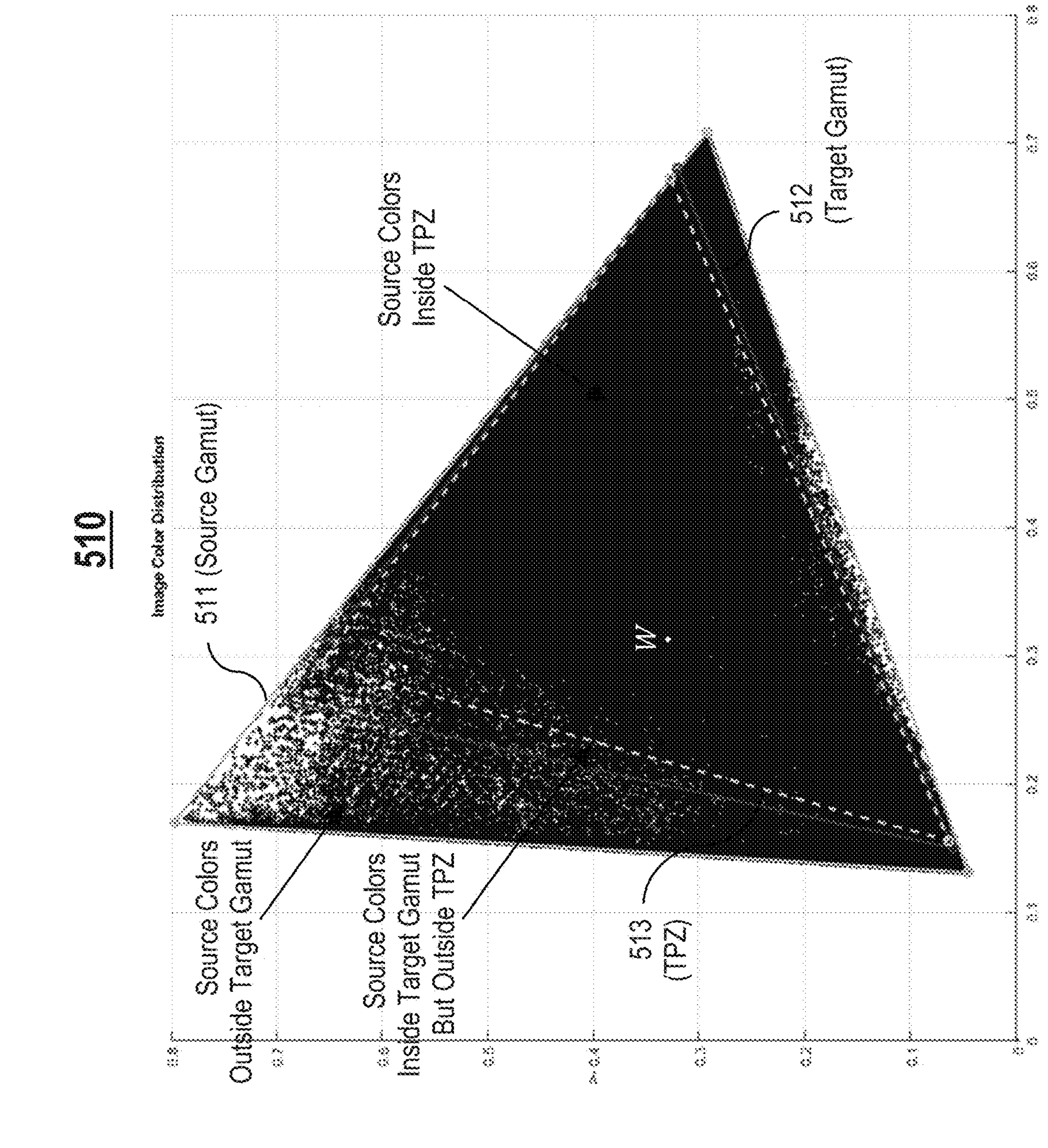
FIG. 13 is a graph illustrating color distribution across a source gamut in CIE 1931 XYZ color space, a target gamut in CIE 1931 XYZ color space, and a TPZ for gamut compression, in one or more embodiments.

FIG. 13 is a graph 510 illustrating color distribution across a source gamut 511 in CIE 1931 XYZ color space, a target gamut 512 in CIE 1931 XYZ color space, and a TPZ 513 for gamut compression, in one or more embodiments. If the source gamut 511 is bigger/wider than the target gamut 512 (e.g., the source gamut 511 is Rec. 2020 and the target gamut 512 is DCI-P3), as shown in FIG. 13, the system 200 determines, via the gamut compression TPZ determination unit 211, the TPZ 513 for gamut compression. For each source color inside the TPZ 513, the system 200, via the dual-way CGM 240, keeps the source color unchanged (i.e., does not move/map/transfer the source color) (see process block 318 of the process 310). A source color outside the TPZ 513 is either inside the target gamut 512 or outside the target gamut 512. For each source color outside the TPZ 513, the system 200, via the dual-way CGM 240, moves/maps/transfers the source color to a target color located in the space between the target gamut 512 and the TPZ 513 (see process blocks 315-316 of the process 310). The TPZ 513 protects most source colors that are inside the target gamut, thereby maintaining perceptual fidelity of the source colors. Unlike conventional systems where source colors outside the target gamut are moved/mapped/transferred to projected counterparts on boundaries of the target gamut, the TPZ 513 provides source colors that are outside the target gamut enough space inside the target gamut to move/map/transfer to (i.e., the space between the target gamut 512 and the TPZ 513), thereby maintaining color continuity of the source colors.

Figure 14:
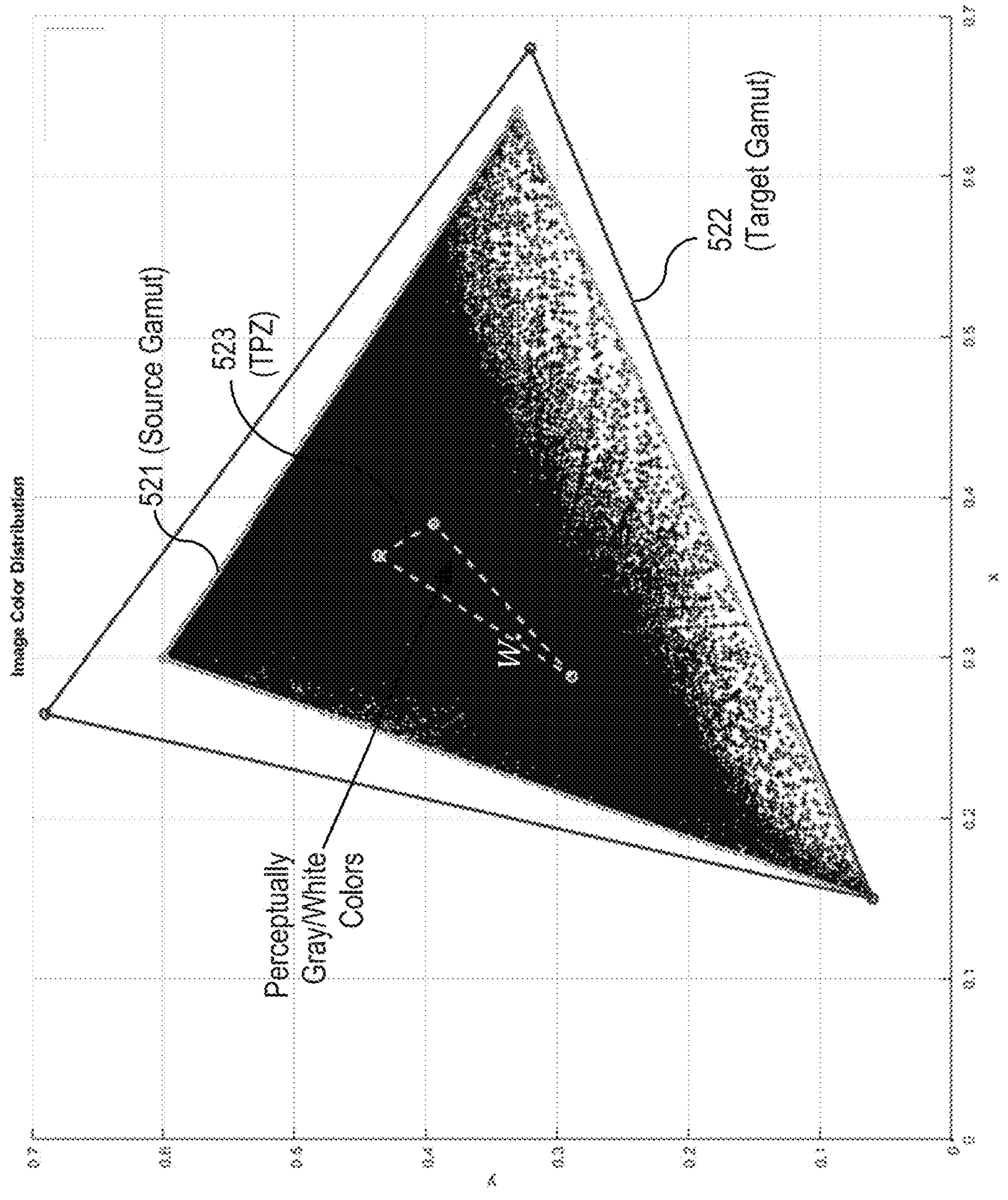
FIG. 14 is a graph illustrating color distribution across a source gamut in CIE 1931 XYZ color space, a target gamut in CIE 1931 XYZ color space, and a TPZ for gamut extension, in one or more embodiments.

FIG. 14 is a graph 520 illustrating color distribution across a source gamut 521 in CIE 1931 XYZ color space, a target gamut 522 in CIE 1931 XYZ color space, and a TPZ 523 for gamut extension, in one or more embodiments. If the source gamut 521 is smaller/narrower than the target gamut 512 (e.g., the source gamut 521 is DCI-P3 and the target gamut 552 is Rec. 709), as shown in FIG. 14, the system 200 determines, via the gamut extension TPZ determination unit 212, the TPZ 523 for gamut extension.

Figure 15:
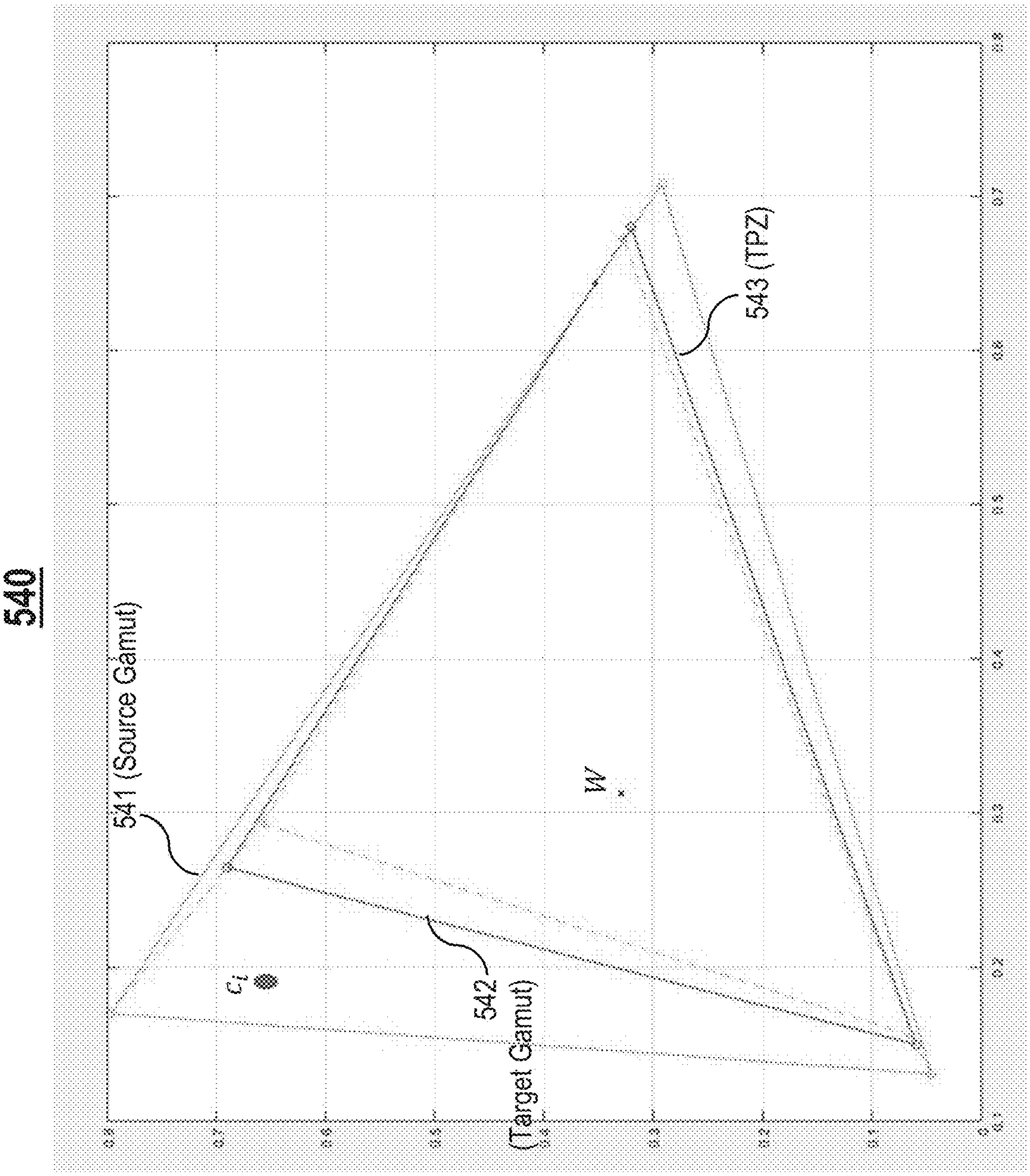
FIG. 15 is a graph illustrating an example representation $c_i$ of an input color in CIE 1931 XYZ color space, in one or more embodiments.

FIG. 15 is a graph 540 illustrating an example representation $c_i$ of an input color in CIE 1931 XYZ color space, in one or more embodiments. Assume an image of a source content comprises an array of pixels, and the input color is a pixel located at row 341 and column 693 of the array. Assume a source gamut 541 of the source content is Rec. 2020 with vertices $R_s$=(0.708, 0.292), $G_s$=(0.170, 0.797), and $B_s$=(0.131, 0.046) defining one or more boundaries of the source gamut 541. Assume a target gamut 542 of a display device 60 is DCI-P3 with vertices $R_t$=(0.680, 0.320), $G_t$=(0.265, 0.690), and $B_t$=(0.150, 0.060) defining one or more boundaries of the target gamut 542. As the source gamut 541 is bigger/wider than the target gamut 542, the system 200 determines, via the gamut compression TPZ determination unit 211, a TPZ 543 for gamut compression with vertices $R_z$=(0.673, 0.327), $G_z$=(0.294, 0.658), and $B_z$=(0.156, 0.064) defining one or more boundaries of the TPZ 543.

Let [r, g, b] generally denote a set of linear RGB values (luminance) of the input color. Let c generally denote a representation of a color (e.g., representation of an input color, projected counterpart of the input color, target color) in CIE 1931 XYZ color space. In one embodiment, the system 200 determines, via the coordinates determination unit 241, a representation c of a color in CIE 1931 XYZ color space in accordance with equation (13) provided below:

$$c=[X,Y,Z]^T=M_c[r,g,b]^T \quad (13),$$

wherein $M_c$ is a source gamut RGB to CIE 1931 XYZ color space conversion matrix included in a CGM dataset (e.g., loaded by the CGM dataset loader unit 230).

A representation c of a color (e.g., representation of an input color, projected counterpart of the input color, target color) in CIE 1931 XYZ color space comprises coordinates (x, y) for a vertex representing the color in CIE 1931 XYZ color space. In one embodiment, the system 200 determines, via the coordinates determination unit 241, the x-coordinate and the y-coordinate in accordance with equations (14)-(15) provided below:

$$x = \frac{X}{X+Y+Z}, \text{ and} \quad (14)$$

$$y = \frac{Y}{X+Y+Z}. \quad (15)$$

Let $c_i$ generally denote a representation of an input color in CIE 1931 XYZ color space. Let $[r_i, g_i, b_i]$ generally denote a set of linear RGB values (luminance) of an input color. A representation $c_i$ of an input color comprises coordinates $(x_i, y_i)$ for a vertex representing the input color in CIE 1931 XYZ color space. In one embodiment, the system 200 determines, via the coordinates determination unit 241, a representation $c_i$ of an input color in accordance with equations (13)-(15) provided above. For example, if a set of linear RGB values (luminance) $[r_i, g_i, b_i]$ of an input color is [0.00010913, 0.0019064,0.00022577], coordinates $(x_i, y_i)$ of a representation $c_i$ of the input color is (0.19063, 0.66367) (determined in accordance with equations (13)-(15) provided above).

Let $M_{s \to z}$ generally denote a source gamut to TPZ conversion matrix. In one embodiment, the system 200 determines, via the source gamut to TPZ conversion matrices determination unit 214, a source gamut to TPZ conversion matrix $M_{s \to z}$ based on coordinates of the vertices $R_s$, $G_s$, and $B_s$ of the source gamut 541, coordinates of the vertices $R_z$, $G_z$, and $B_z$ of the TPZ 543, and conversion matrix computation rules defined by SMPTE (as the target gamut 542 is an international standard defined by SMPTE). The source gamut to TPZ conversion matrix $M_{s \to z}$ is determined off-device (i.e., off-device processing). For example, $$M_{S \to Z} = \begin{bmatrix} 1.5472 & -0.4563 & -0.0909 \\ -0.0844 & 1.0974 & -0.0130 \\ 0.0035 & -0.0280 & 1.0245 \end{bmatrix}.$$

Let $c_p$ generally denote a projected counterpart of an input color, wherein the projected counterpart $c_p$ is in a TPZ (e.g., on a corresponding boundary of the TPZ).

Figure 16:
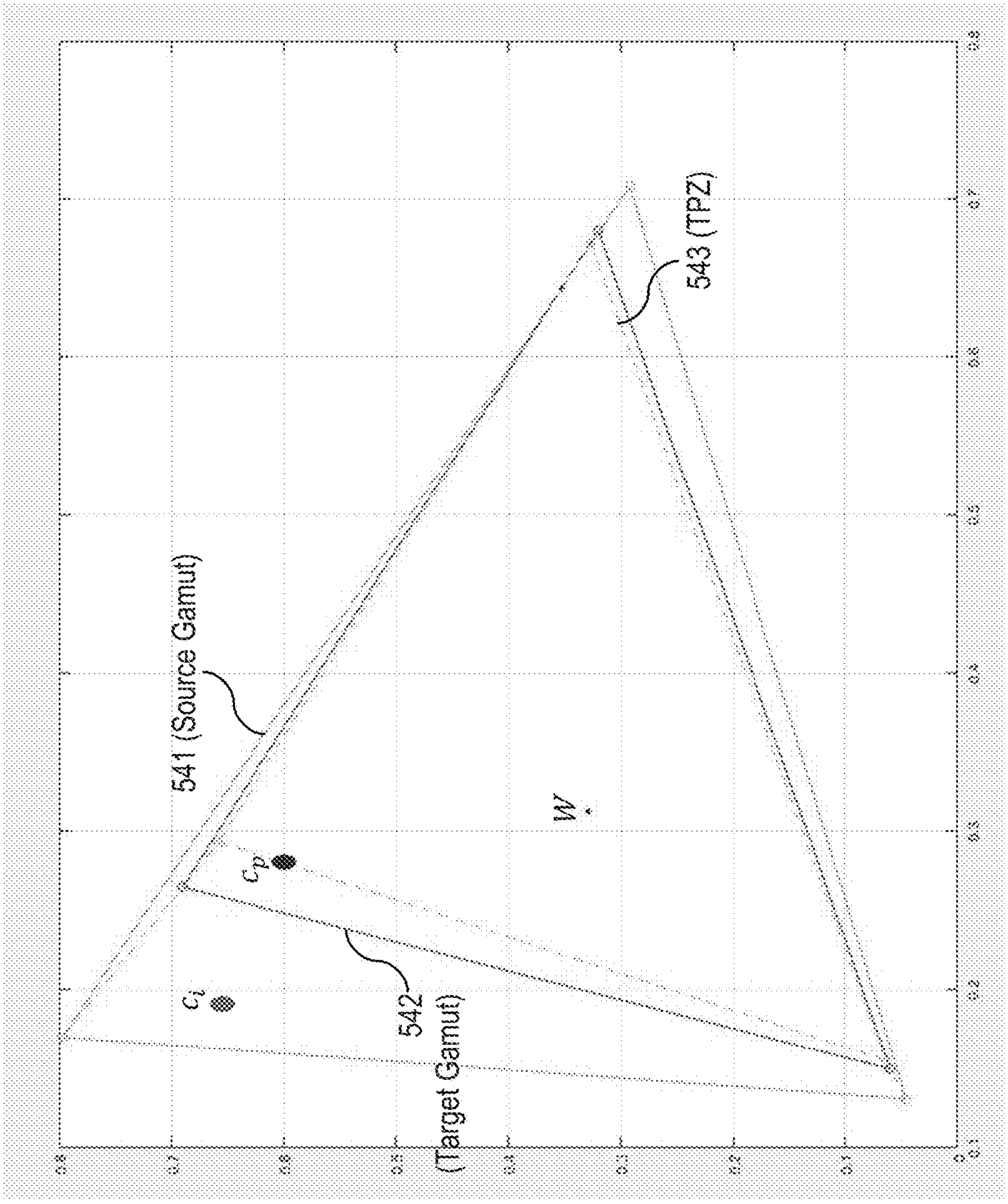
FIG. 16 is the graph illustrating an example color projection of the representation $c_i$ of the input color to a projected counterpart $c_p$ in CIE 1931 XYZ color space, in one or more embodiments.

FIG. 16 is the graph 540 illustrating an example color projection of the representation $c_i$ of the input color to a projected counterpart $c_p$ in CIE 1931 XYZ color space, in one or more embodiments. Let $[r_p, g_p, b_p]$ generally denote a set of linear RGB values (luminance) of the projected counterpart $c_p$. In one embodiment, the system 200, via the coordinates determination unit 241, performs color projection to color project the input color to the projected counterpart $c_p$ in the TPZ 543, wherein the projected counterpart $c_p$ operates as an anchor point (e.g., on a corresponding boundary of the TPZ 543). Specifically, the coordinates determination unit 241 determines the projected counterpart $c_p$ utilizing a source gamut to TPZ conversion matrix $M_{s \to z}$, in accordance with equation (16) provided below:

$$[r_p, g_p, b_p]^T = M_{s \to z}[r_i, g_i, b_i] \qquad (16).$$

For example, if a set of RGB values (color/intensity) of the input color is [158, 361, 200], and an electronic-optical transferring function (EOTF) is PQ, the set of linear RGB values (luminance) $[r_i, g_i, b_i]$ is [0.00010913, 0.0019064, 0.00022577] when PQ is applied to the set of RGB values (color/intensity). If $$M_{S \to Z} = \begin{bmatrix} 1.5472 & -0.4563 & -0.0909 \\ -0.0844 & 1.0974 & -0.0130 \\ 0.0035 & -0.0280 & 1.0245 \end{bmatrix},$$

and $[r_i, g_i, b_i]$=[0.00010913, 0.0019064, 0.00022577], the set of linear RGB values (luminance) $[r_p, g_p, b_p]$ of the projected counterpart $c_p$ is $$\begin{bmatrix} r_p \\ g_p \\ b_p \end{bmatrix} = \begin{bmatrix} 1.5472 & -0.4563 & -0.0909 \\ -0.0844 & 1.0974 & -0.0130 \\ 0.0035 & -0.0280 & 1.0245 \end{bmatrix} \begin{bmatrix} 0.00010913 \\ 0.0019064 \\ 0.00022577 \end{bmatrix} = \begin{bmatrix} -0.00072154 \\ 0.0021 \\ 0.00017839 \end{bmatrix}.$$

An input color is outside of a TPZ (e.g., TPZ 543) if a set of linear RGB values (luminance) $[r_p, g_p, b_p]$ of a projected counterpart $c_p$ of the input color comprises a negative RGB value (luminance). In one embodiment, as the hardware of the display device 60 has no negative RGB values (luminance), the system 200, via the coordinates determination unit 241, clips a set of linear RGB values (luminance) $[r_p, g_p, b_p]$ of a projected counterpart $c_p$ to the range [0, 1]. For example, if a set of linear RGB values (luminance) $[r_p, g_p, b_p]$ of a projected counterpart $c_p$ includes the negative RGB value (luminance) −0.00072154, the system 200 clips this negative RGB value (luminance) to zero, such that $$c_p = \left[\begin{bmatrix} -0.00072154 \\ 0.0021 \\ 0.00017839 \end{bmatrix}\right]^{0\sim1} = \begin{bmatrix} 0 \\ 0.0021 \\ 0.00017839 \end{bmatrix}.$$

A projected counterpart $c_p$ is an anchor point on a corresponding boundary of a TPZ if the set of linear RGB values (luminance) $[r_p, g_p, b_p]$ of the projected counterpart $c_p$ includes a negative RGB value (luminance) that is clipped to zero. For example, as shown in FIG. 16, as $$c_p = \begin{bmatrix} 0 \\ 0.0021 \\ 0.00017839 \end{bmatrix},$$

projected counterpart $c_p$ is an anchor point on a corresponding boundary of the TPZ 543.

For each input color, a projected counterpart $c_p$ of the input color comprises coordinates $(x_p, y_p)$ for a vertex in CIE 1931 XYZ color space. In one embodiment, the system 200 determines, via the coordinates determination unit 241, a projected counterpart $c_p$ of an input color in accordance with equations (13)-(15) provided above. For example, if a set of linear RGB values (luminance) $[r_p, g_p, b_p]$ of the projected counterpart $c_p$ is [−0.00072154, 0.0021, 0.00017839], coordinates $(x_p, y_p)$ of the projected counterpart $c_p$ is (0.2803, 0.6010) (determined in accordance with equations (13)-(15) provided above).

Figure 17:
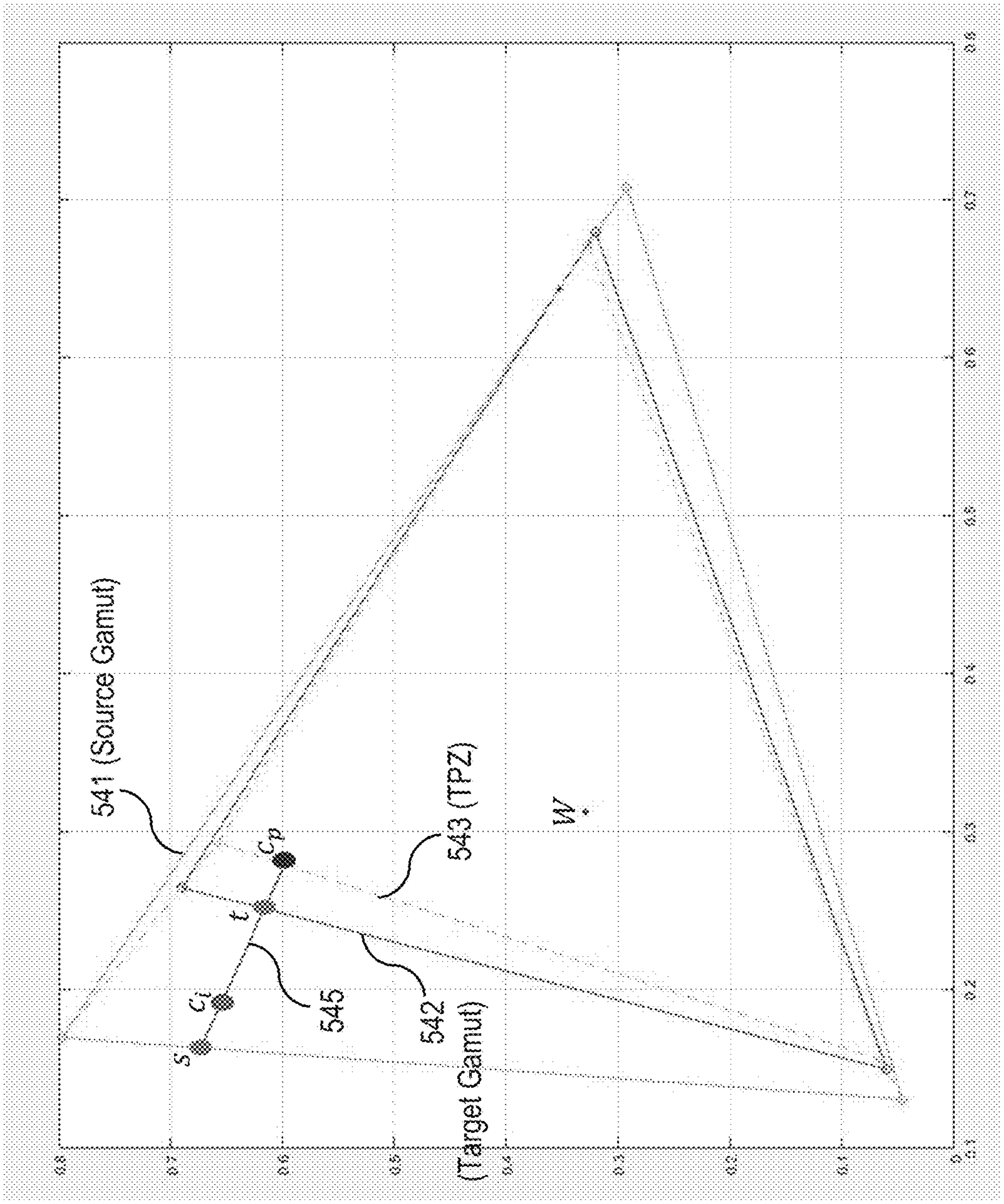
FIG. 17 is the graph illustrating an example color moving path in CIE 1931 XYZ color space, in one or more embodiments.

FIG. 17 is the graph 540 illustrating an example color moving path 545 in CIE 1931 XYZ color space, in one or more embodiments. The system 200 provides a universal framework for both gamut compression and gamut extension. The system 200 performs, via the color moving path determination unit 242, the same set of operations for gamut compression and gamut extension when determining a color moving path for an input color.

Specifically, the color moving path determination unit 242 determines whether a color moving path is required for an input color based on coordinates $(x_i, y_i)$ of a representation $c_i$ of the input color and coordinates $(x_p, y_p)$ of a projected counterpart $c_p$ of the input color. If the representation $c_i$ is inside a TPZ, the color moving path determination unit 242 determines that a color moving path is not required for the input color as the input color is already inside a target gamut, and sets the coordinates of the projected counterpart $c_p$ to the coordinates of the representation $c_i$, i.e., $(x_i, y_i)=(x_p, y_p)$. As described in detail later, color space conversion is then applied, via the conversion unit 244, to obtain a representation of the input color in the target gamut.

If the representation $c_i$ is outside of the TPZ, the color moving path determination unit 242 determines that a color moving path is required for the input color, and obtains the color moving path by connecting the representation $c_i$ and the projected counterpart $c_p$. The representation $c_i$ and the projected counterpart $c_p$ are connected to form a directional vector $\overline{c_i c_p}$.

Let s generally denote a source gamut reference point located at an intersection of a directional vector $\overline{c_i c_p}$ and a corresponding boundary of a source gamut. Let t generally denote a target gamut reference point located at an intersection of a directional vector $\overline{c_i c_p}$ and a corresponding boundary of a target gamut. Let $\overline{sc_p}$ generally denote a color moving path for an input color, wherein the color moving path $\overline{sc_p}$ includes coordinates of a representation $c_i$ of the input color, coordinates of a projected counterpart $c_p$ of the input color, coordinates of a source gamut reference point s, and coordinates of a target gamut reference point t.

For example, as shown in FIG. 17 for gamut compression, as the representation $c_i$ is outside of the TPZ 543, the color moving path determination unit 242 obtains the color moving path 545 by connecting the representation $c_i$ and the projected counterpart $c_p$. The color moving path 545 includes a source gamut reference point s on a corresponding boundary of the source gamut 541, and a target gamut reference point t on a corresponding boundary of the target gamut 542 (i.e., the color moving path 545 is an example $\overline{sc_p}$). As described in detail later herein, the system 200 performs, via the color movement determination unit 243, gamut compression by moving/mapping/transferring the input color along the color moving path 545 from the representation $c_i$ in the source gamut 541 to a target color $c_o$ (FIG. 18) in the target gamut 542.

Figure 18:
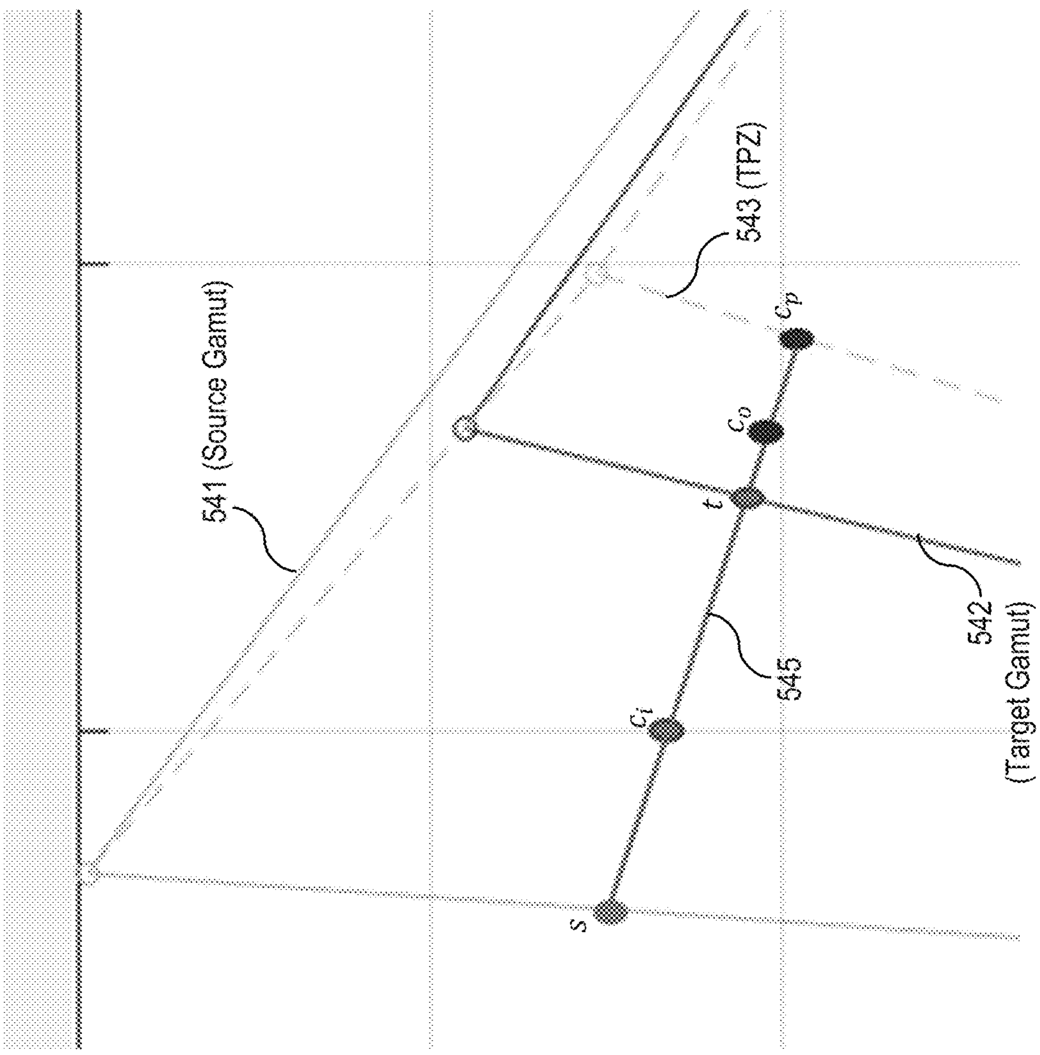
FIG. 18 is an expanded view of the graph illustrating an example target color $c_o$ in CIE 1931 XYZ color space, in one or more embodiments.

FIG. 18 is an expanded view of the graph 540 illustrating an example target color $c_o$ in CIE 1931 XYZ color space, in one or more embodiments. The system 200 performs, via the color movement determination unit 243, the same set of operations for gamut compression and gamut extension when moving/mapping/transferring an input color from a representation $c_i$ of the input color in a source gamut to a target color $c_o$ in a target gamut along a color moving path $\overline{sc_p}$ for the input color. For each input color, a target color $c_o$ that the input color is moved/mapped/transferred to comprises coordinates $(x_o, y_o)$ for a vertex in CIE 1931 XYZ color space.

Specifically, in one embodiment, the color movement determination unit 243 determines a target color $c_o$ in a target gamut along a color moving path $\overline{sc_p}$ for an input color by: (1) determining a relative position β of a representation $c_i$ of the input color in the color moving path $\overline{sc_p}$, and (2) determining coordinates $(x_o, y_o)$ of the target color $c_o$ such that a relative position of the target color $c_o$ in $\overline{tc_p}$ is the same as β.

In one embodiment, the color movement determination unit 243 determines a relative position β of a representation $c_i$ of an input color in a color moving path $\overline{sc_p}$ in accordance with equation (17) provided below:

$$\beta = \frac{|\overline{c_i c_p}|}{|\overline{sc_p}|}, \quad (17)$$

wherein $|\overline{c_i c_p}|$ is a distance between the representation $c_i$ and a projected counterpart $c_p$ of the input color, and $|\overline{sc_p}|$ is a distance between a source gamut reference point s and the projected counterpart $c_p$.

In one embodiment, the color movement determination unit 243 determines the x-coordinate $x_o$ and the y-coordinate $y_o$ of the target color $c_o$ in accordance with equations (18)-(19) provided below:

$$x_o = x_p + \beta(x_t - x_p) \quad (18), \text{ and}$$

$$y_o = y_p + \beta(y_t - y_p) \quad (19),$$

wherein $x_t$ is the x-coordinate of a target gamut reference point t, and $y_t$ is the y-coordinate of the target gamut reference point t, and the target color $c_o$ satisfies equation (20) provided below:

$$\frac{|\overline{c_i c_p}|}{|\overline{sc_p}|} = \beta = \frac{|\overline{c_o c_p}|}{|\overline{tc_p}|}. \quad (20)$$

For example, as shown in FIG. 18 for gamut compression, the color movement determination unit 243 moves/maps/transfers the input color from the representation $c_i$ in the source gamut 541 to the target color $c_o$ in the target gamut 542 along the color moving path 545, such that a relative position of the target color $c_o$ in $\overline{tc_p}$ is equal to a relative position β of the representation $c_i$ in the color moving path $\overline{sc_p}$.

Figure 19:
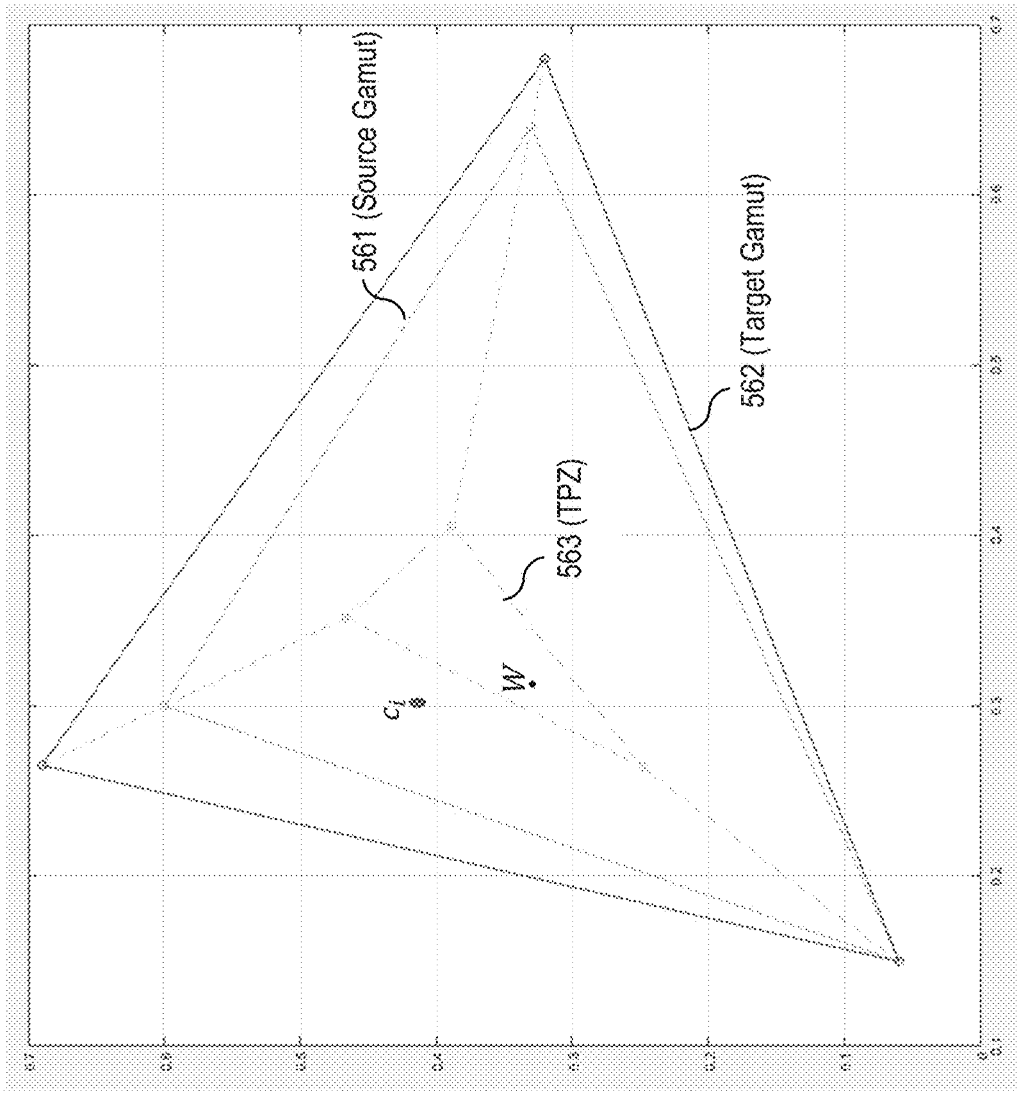
FIG. 19 is a graph illustrating an example representation $c_i$ of an input color in CIE 1931 XYZ color space, in one or more embodiments.

FIG. 19 is a graph 560 illustrating an example representation $c_i$ of an input color in CIE 1931 XYZ color space, in one or more embodiments. Assume an image of a source content comprises an array of pixels, and the input color is a pixel located at row 462 and column 2974 of the array. Assume a source gamut 561 of the source content is Rec. 709 with vertices $R_s$=(0.64, 0.33), $G_s$=(0.30, 0.60), and $B_s$=(0.15, 0.06) defining one or more boundaries of the source gamut 561. Assume a target gamut 562 of a display device 60 is DCI-P3 with vertices $R_t$=(0.680, 0.320), $G_t$=(0.265, 0.690), and $B_t$=(0.150, 0.060) defining one or more boundaries of the target gamut 562. As the source gamut 561 is bigger/wider than the target gamut 562, the system 200 determines, via the gamut extension TPZ determination unit 212, a TPZ 563 for gamut extension with vertices $R_z$=(0.384, 0.394), $G_z$=(0.364, 0.436), and $B_z$=(0.288, 0.289) defining one or more boundaries of the TPZ 563.

In one embodiment, the system 200 determines, via the source gamut to TPZ conversion matrices determination unit 214, a source gamut to TPZ conversion matrix $M_{s\rightarrow z}$ based on coordinates of the vertices $R_s$, $G_s$, and $B_s$ of the source gamut 561, coordinates of the vertices $R_z$, $G_z$, and $B_z$ of the TPZ 563, and conversion matrix computation rules defined by SMPTE (as the target gamut 562 is an international standard defined by SMPTE). The source gamut to TPZ conversion matrix $M_{s\rightarrow z}$ is determined off-device (i.e., off-device processing). For example $$M_{S\rightarrow Z} = \begin{bmatrix} 18.6155 & -15.3816 & -2.2339 \\ -5.5306 & 8.7760 & -2.2454 \\ -0.4717 & -0.0531 & 1.5248 \end{bmatrix}.$$

For example, if a set of RGB values (color/intensity) of the input color is [361, 469, 457], and an EOTF is Gamma, the set of linear RGB values (luminance) $[r_i, g_i, b_i]$ is [0.10111, 0.17983, 0.16986] when Gamma is applied to the set of RGB values (color/intensity). If $[r_i, g_i, b_i]$=[0.10111, 0.17983, 0.16986], coordinates $(x_i, y_i)$ of a representation $c_i$ of the input color is (0.28244, 0.33559) (determined in accordance with equations (13)-(15) provided above).

Figure 20:
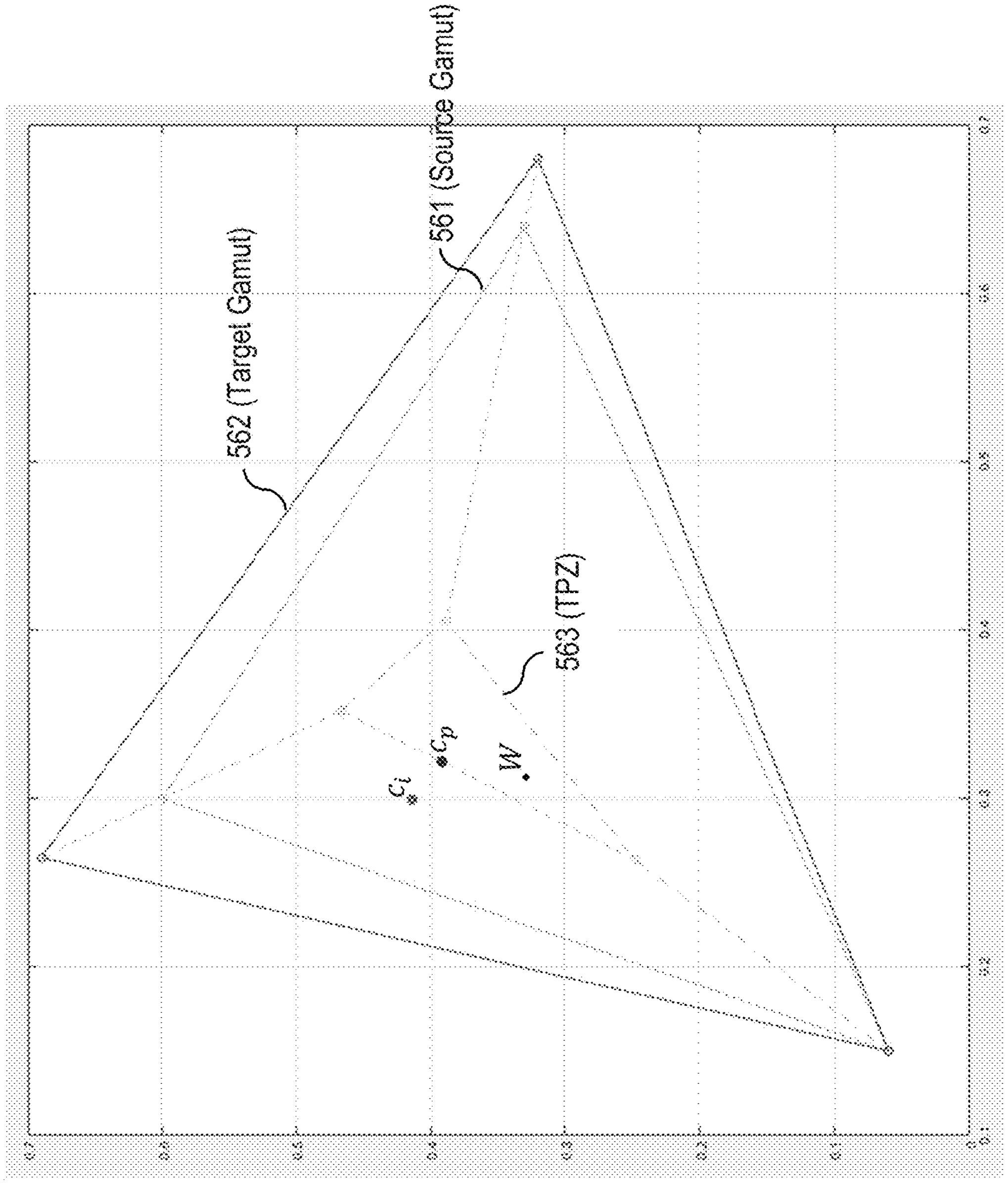
FIG. 20 is the graph illustrating an example color projection of the representation $c_i$ of the input color to a projected counterpart $c_p$ in CIE 1931 XYZ color space, in one or more embodiments.

FIG. 20 is the graph 560 illustrating an example color projection of the representation $c_i$ of the input color to a projected counterpart $c_p$ in CIE 1931 XYZ color space, in one or more embodiments. In one embodiment, the system 200, via the coordinates determination unit 241, performs color projection to color project the input color to the projected counterpart $c_p$ in the TPZ 563, wherein the projected counterpart $c_p$ operates as an anchor point (e.g., on a corresponding boundary of the TPZ 563). Specifically, the coordinates determination unit 241 determines the projected counterpart $c_p$ utilizing the source gamut to TPZ conversion matrix $M_{s\rightarrow z}$. For example, if $$M_{S\rightarrow Z} = \begin{bmatrix} 18.6155 & -15.3816 & -2.2339 \\ -5.5306 & 8.7760 & -2.2454 \\ -0.4717 & -0.0531 & 1.5248 \end{bmatrix},$$

and $[r_i, g_i, b_i]=[0.10111, 0.17983, 0.16986]$, coordinates $(x_p, y_p)$ of a projected counterpart $c_p$ of the input color is (0.3602, 0.3010) (determined in accordance with equations (13)-(15) provided above).

Figure 21:
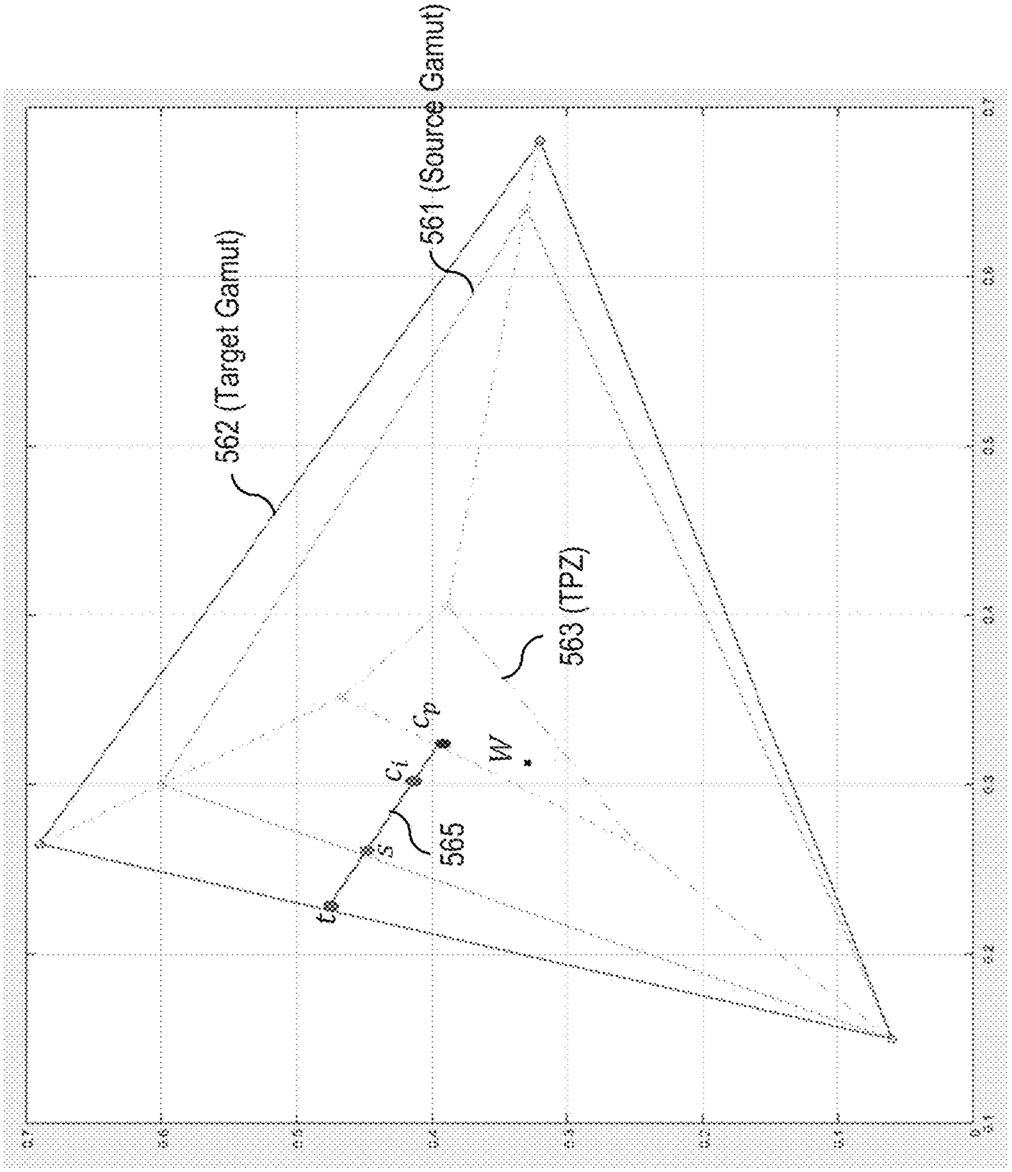
FIG. 21 is the graph illustrating an example color moving path in CIE 1931 XYZ color space, in one or more embodiments.

FIG. 21 is the graph 560 illustrating an example color moving path 565 in CIE 1931 XYZ color space, in one or more embodiments. For example, as shown in FIG. 21 for gamut extension, as the representation $c_i$ is outside of the TPZ 563, the color moving path determination unit 242 obtains the color moving path 565 by connecting the representation $c_i$ and the projected counterpart $c_p$. The color moving path 565 includes a source gamut reference point s on a corresponding boundary of the source gamut 561, and a target gamut reference point t on a corresponding boundary of the target gamut 562 (i.e., the color moving path 565 is an example $\overline{sc_p}$). As described in detail later herein, the system 200 performs, via the color movement determination unit 243, gamut extension by moving/mapping/transferring the input color along the color moving path 565 from the representation $c_i$ in the source gamut 561 to a target color $c_o$ (FIG. 22) in the target gamut 562.

Figure 22:
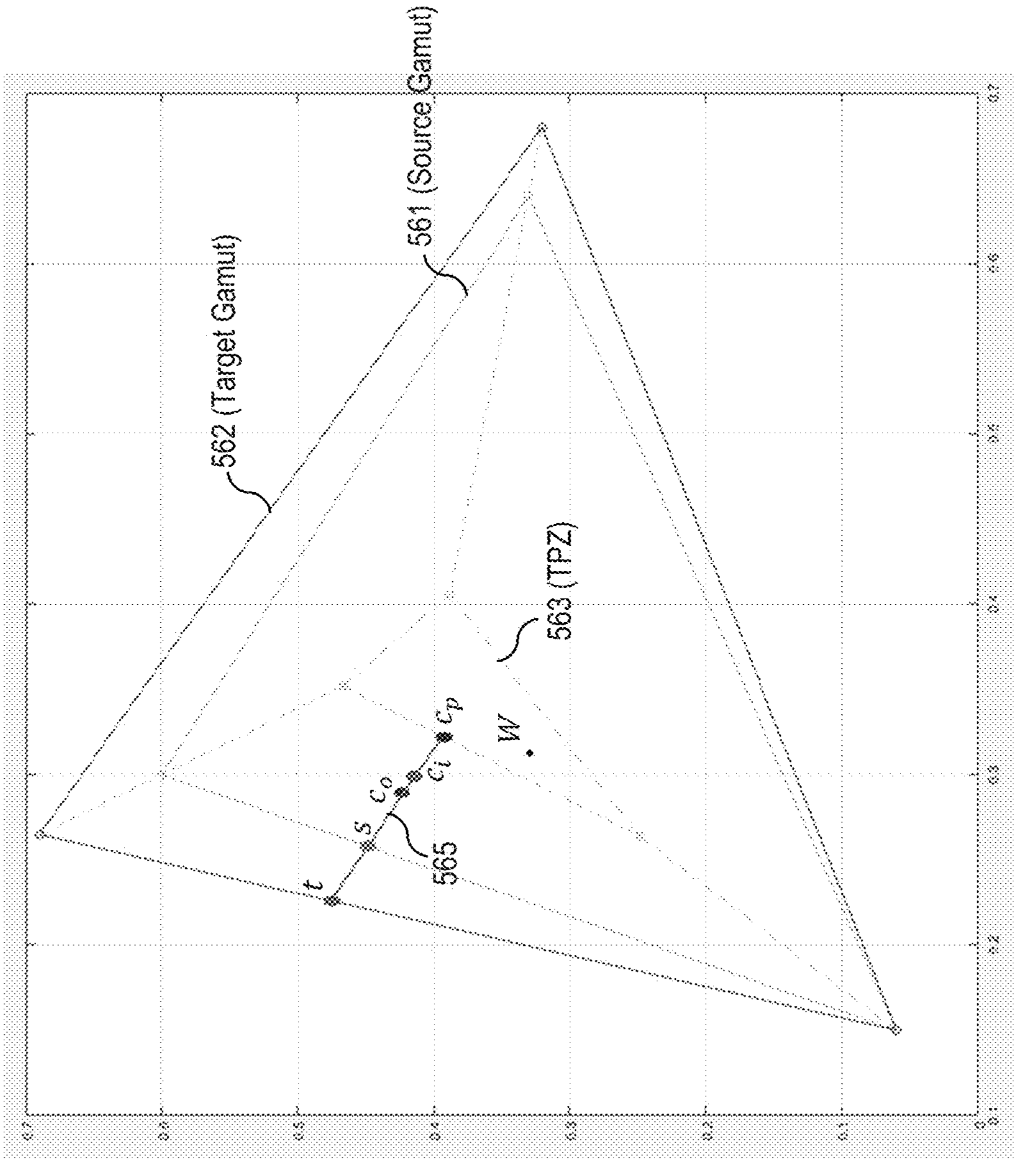
FIG. 22 is an expanded view of the graph illustrating an example target color $c_o$ in CIE 1931 XYZ color space, in one or more embodiments.

FIG. 22 is an expanded view of the graph 560 illustrating an example target color $c_o$ in CIE 1931 XYZ color space, in one or more embodiments. For example, as shown in FIG. 22 for gamut extension, the color movement determination unit 243 moves/maps/transfers the input color from the representation $c_i$ in the source gamut 561 to the target color $c_o$ in the target gamut 562 along the color moving path 565, such that a relative position β of the target color $c_o$ in $\overline{tc_p}$ is equal to a relative position β of the representation $c_i$ in the color moving path $\overline{sc_p}$.

The system 200 provides a universal framework for both gamut compression and gamut extension, i.e., two different and opposite processing methods in the same hardware entity. The system 200 performs the same set of operations for gamut compression and gamut extension when determining a color moving path for an input color.

Figure 23:
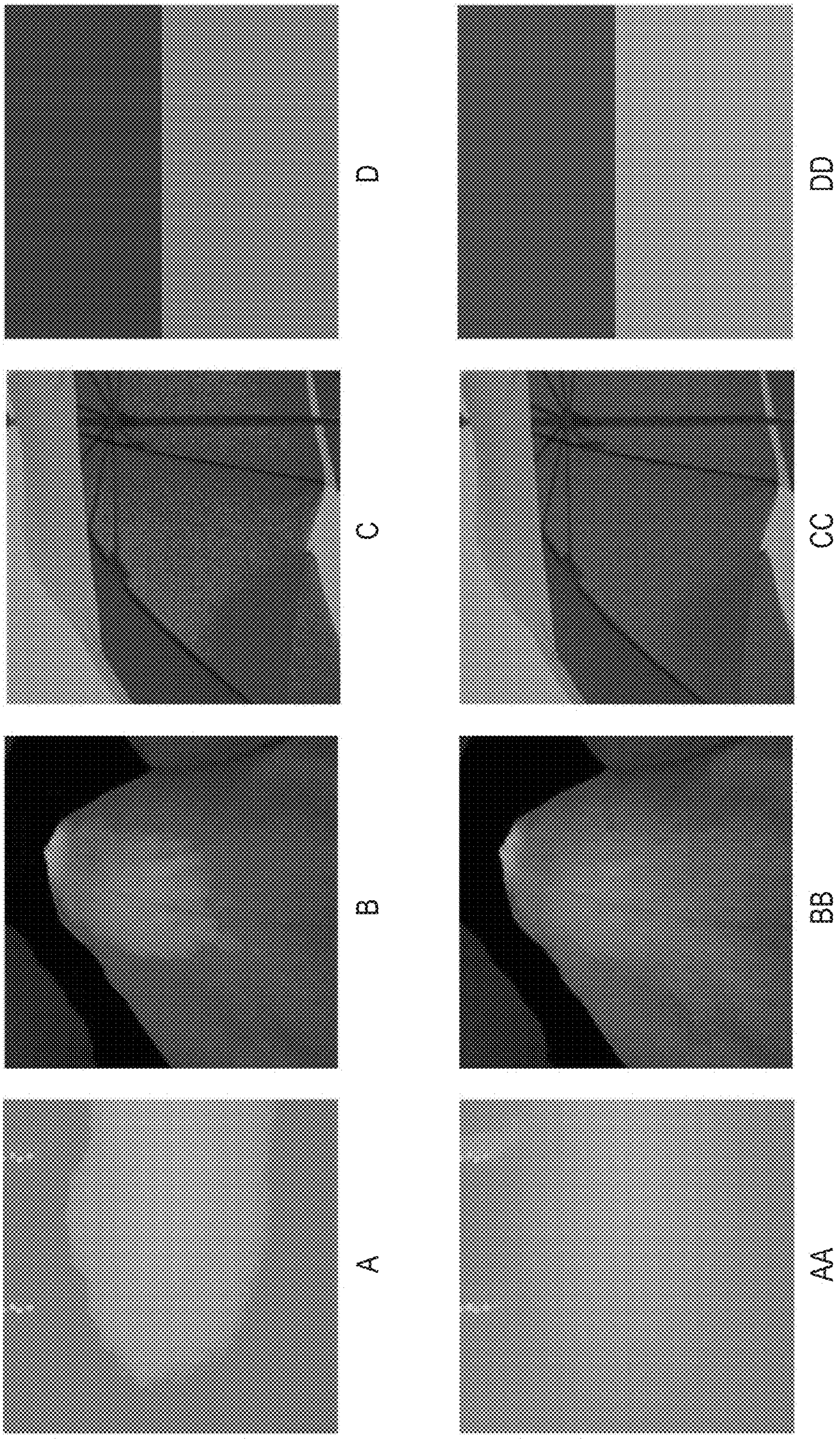
FIG. 23 illustrates a set of results comparing performance of a conventional color space conversion (CSC)-model based CGM technique against gamut compression implemented by the system, in one or more embodiments.

FIG. 23 illustrates a set of results comparing performance of a conventional CSC-model based CGM technique against gamut compression implemented by the system 200, in one or more embodiments. The set of results comprises a first subset of images A, B, C, and D encompassing output generated via the conventional CSC-model based CGM technique for input content, and a second subset of images AA, BB, CC, and DD encompassing output generated via the system 200 for the same input content. As shown in images A-D of FIG. 23, gamut clipping leads to visible banding and spot artifacts and also over-saturated colors. By comparison, the system 200 produces smooth and natural colors, and does not lead to any visible artifacts, as shown in images AA-DD of FIG. 23.

Figure 24:
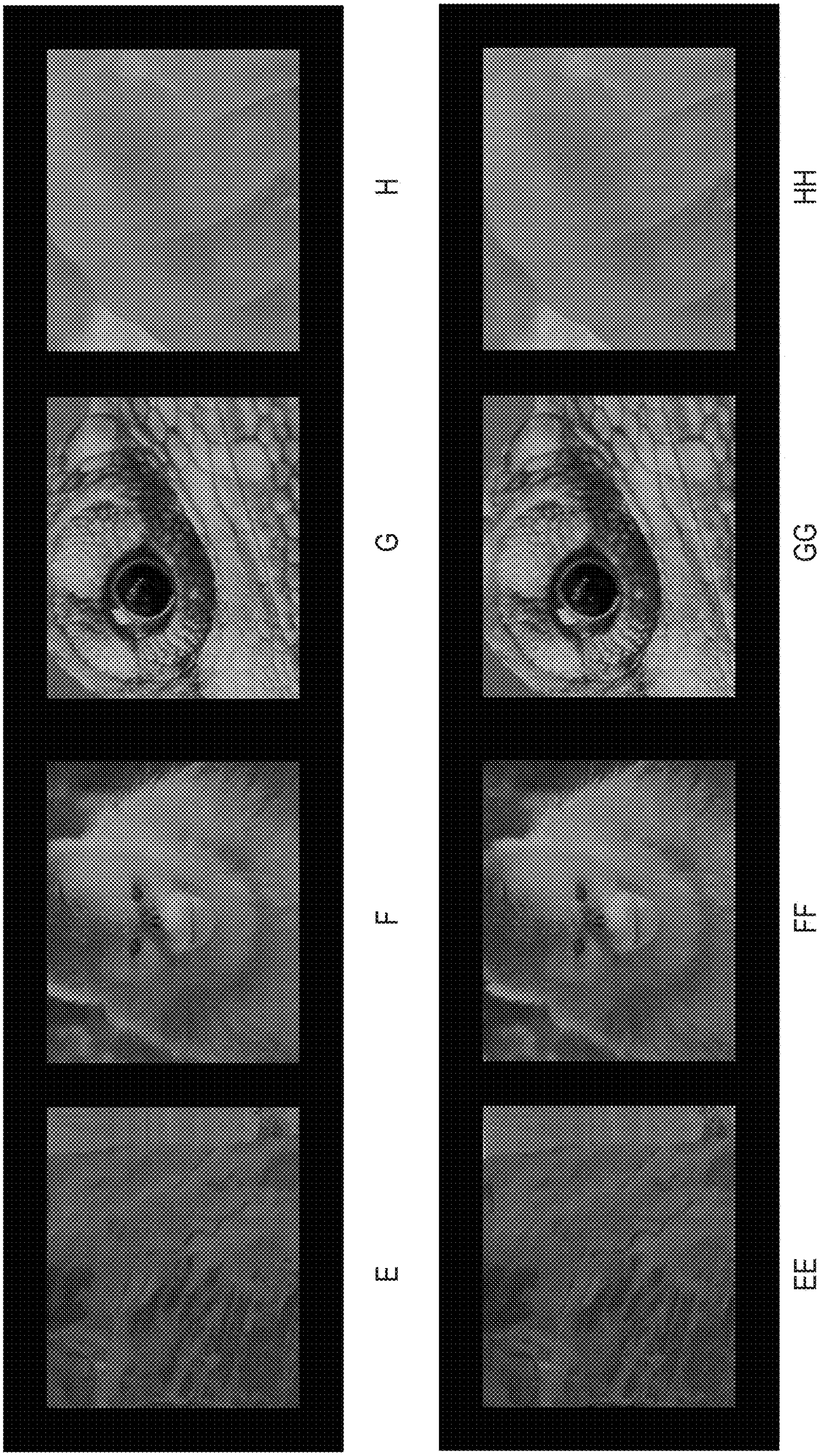
FIG. 24 illustrates another set of results comparing performance of a conventional CSC-model based CGM technique against gamut extension implemented by the system, in one or more embodiments.

FIG. 24 illustrates another set of results comparing performance of a conventional CSC-model based CGM technique against gamut extension implemented by the system 200, in one or more embodiments. The set of results comprises a first subset of images E, F, G, and H encompassing output generated via the conventional CSC-model based CGM technique for input content, and a second subset of images EE, FF, GG, and HH encompassing output generated via the system 200 for the same input content. As shown in images E-H of FIG. 24, gamut clipping leads to visible banding and spot artifacts and also over-saturated colors. By comparison, the system 200 produces smooth and natural colors, and does not lead to any visible artifacts, as shown in images EE-HH of FIG. 24.

Figure 25:
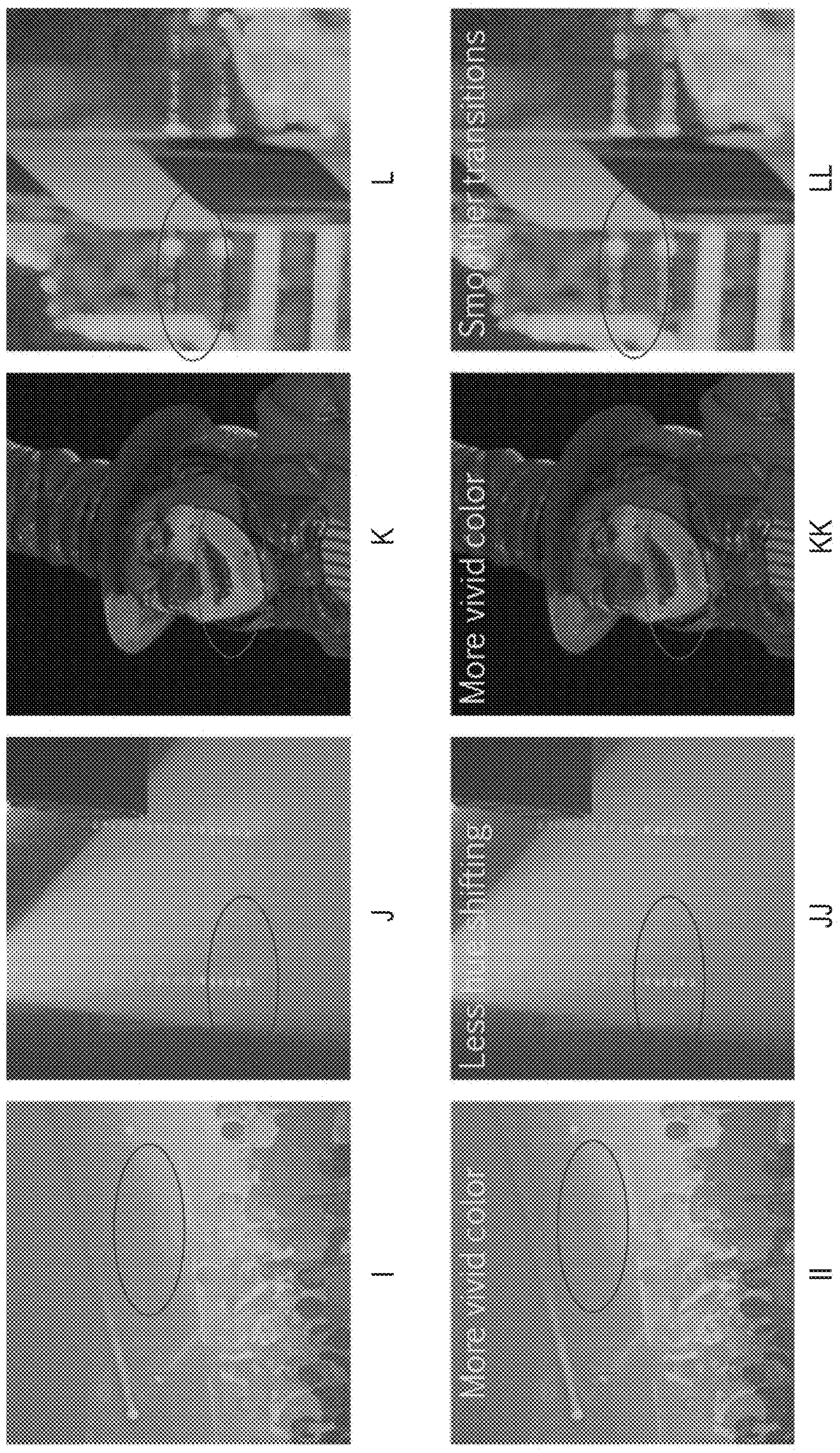
FIG. 25 illustrates yet another set of results comparing performance of a conventional CAM-based CGM technique against the CGM implemented by the system, in one or more embodiments.

FIG. 25 illustrates yet another set of results comparing performance of a conventional CAM-based CGM technique against the CGM implemented by the system 200, in one or more embodiments. The set of results comprises a first subset of images I, J, K, and L encompassing output generated via the conventional CAM-based CGM technique for input content, and a second subset of images II, JJ, KK, and LL encompassing output generated via the system 200 for the same input content. As shown using ovals to reference differences between the images in FIG. 25, the system 200 produces more vivid colors (not flattened like the conventional CAM-based CGM technique), less hue shifting, and smoother transitions.

Figure 26:
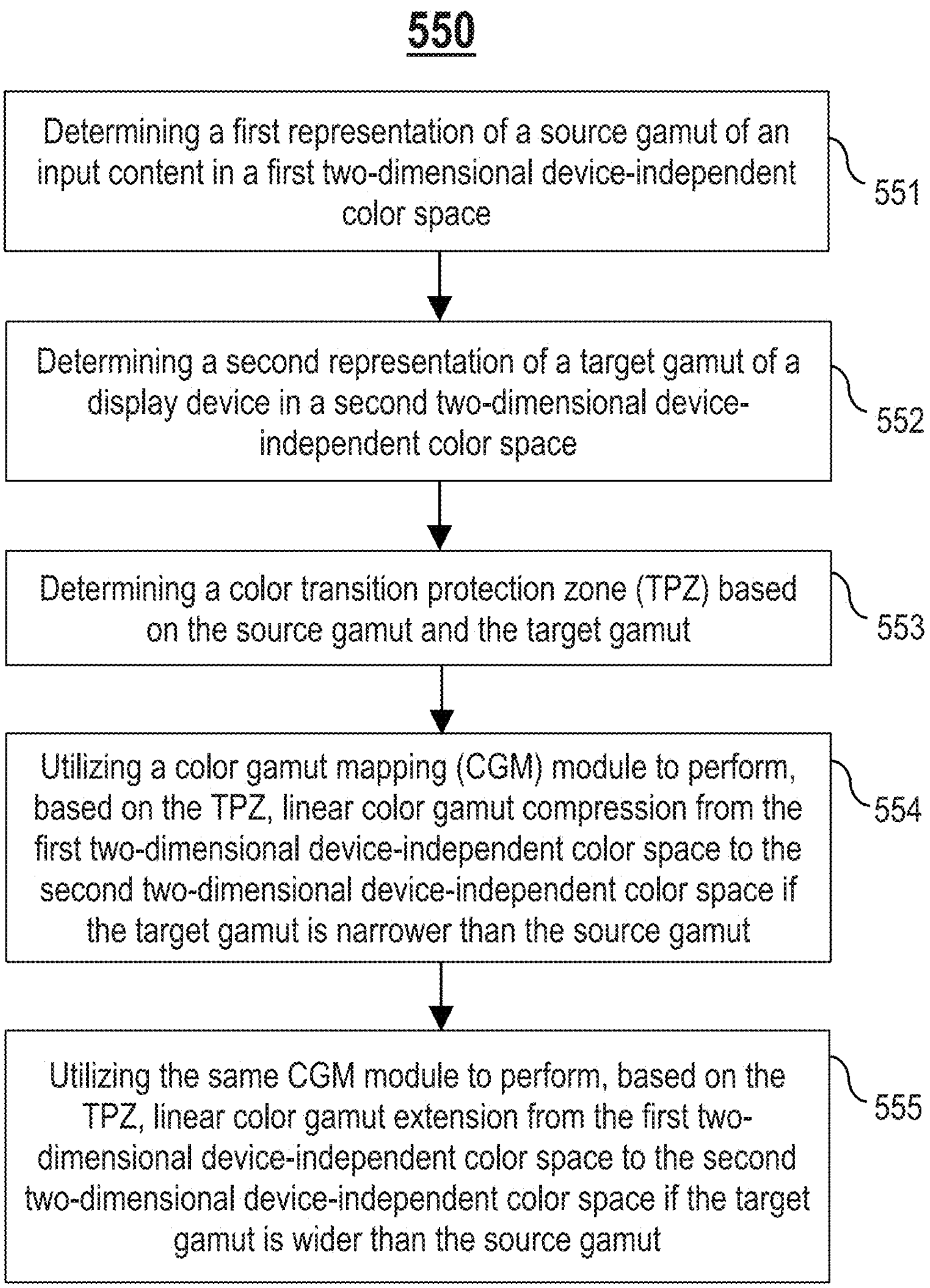
FIG. 26 is a flowchart of an example process for implementing color gamut mapping of source content for presentation on a display device, in one or more embodiments.

FIG. 26 is a flowchart of an example process 550 for implementing color gamut mapping of source content for presentation on a display device, in one or more embodiments. Process block 551 includes determining a first representation of a source gamut of an input content in a first two-dimensional device-independent color space. Process block 552 includes determining a second representation of a target gamut of a display device in a second two-dimensional device-independent color space. Process block 553 includes determining a TPZ based on the source gamut and the target gamut. Process block 554 includes utilizing a CGM module to perform, based on the TPZ, linear color gamut compression from the first two-dimensional device-independent color space to the second two-dimensional device-independent color space if the target gamut is narrower than the source gamut. Process block 555 includes utilizing the same CGM module to perform, based on the TPZ, linear color gamut extension from the first two-dimensional device-independent color space to the second two-dimensional device-independent color space if the target gamut is wider than the source gamut.

In one embodiment, process blocks 551-555 may be performed by one or more components of the color gamut mapping system 200, such as the dual-way CGM system 240.

Figure 27:
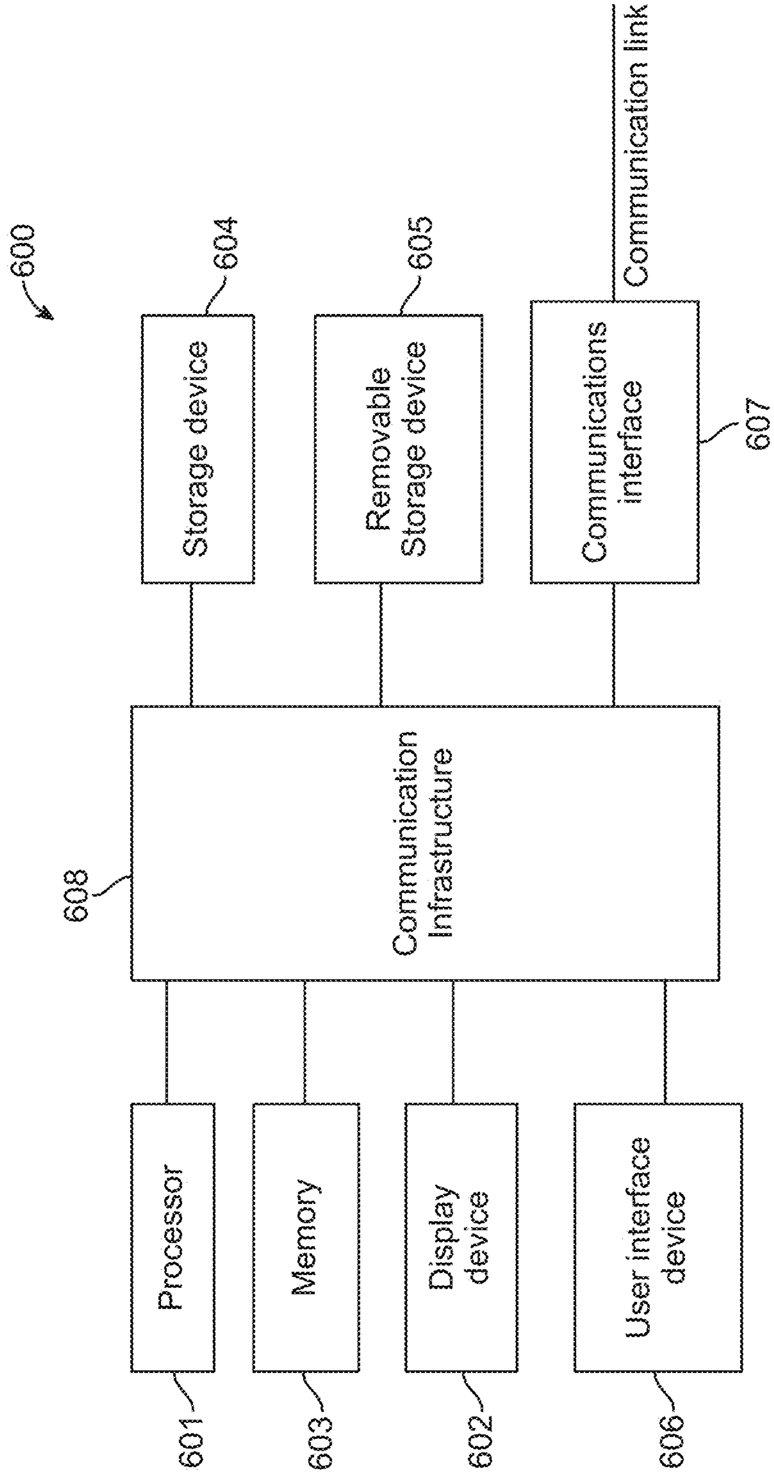
FIG. 27 is a high-level block diagram showing an information processing system comprising a computer system useful for implementing the disclosed embodiments.

FIG. 27 is a high-level block diagram showing an information processing system comprising a computer system 600 useful for implementing the disclosed embodiments. The systems 190 and 200 may be incorporated in the computer system 600. The computer system 600 includes one or more processors 601, and can further include an electronic display device 602 (for displaying video, graphics, text, and other data), a main memory 603 (e.g., random access memory (RAM)), storage device 604 (e.g., hard disk drive), removable storage device 605 (e.g., removable storage drive, removable memory module, a magnetic tape drive, optical disk drive, computer readable medium having stored therein computer software and/or data), viewer interface device 606 (e.g., keyboard, touch screen, keypad, pointing device), and a communication interface 607 (e.g., modem, a network interface (such as an Ethernet card), a communications port, or a PCMCIA slot and card). The communication interface 607 allows software and data to be transferred between the computer system and external devices. The system 600 further includes a communications infrastructure 608 (e.g., a communications bus, cross-over bar, or network) to which the aforementioned devices/modules 601 through 607 are connected.

Information transferred via communications interface 607 may be in the form of signals such as electronic, electromagnetic, optical, or other signals capable of being received by communications interface 607, via a communication link that carries signals and may be implemented using wire or cable, fiber optics, a phone line, a cellular phone link, an radio frequency (RF) link, and/or other communication channels. Computer program instructions representing the block diagram and/or flowcharts herein may be loaded onto a computer, programmable data processing apparatus, or processing devices to cause a series of operations performed thereon to generate a computer implemented process. In one embodiment, processing instructions for process 300 (FIG. 5), process 310 (FIG. 6), process 500 (FIG. 12), and process 550 (FIG. 26) may be stored as program instructions on the memory 603, storage device 604, and/or the removable storage device 605 for execution by the processor 601.

Embodiments have been described with reference to flowchart illustrations and/or block diagrams of methods, apparatus (systems) and computer program products. Each block of such illustrations/diagrams, or combinations thereof, can be implemented by computer program instructions. The computer program instructions when provided to a processor produce a machine, such that the instructions, which execute via the processor create means for implementing the functions/operations specified in the flowchart and/or block diagram. Each block in the flowchart/block diagrams may represent a hardware and/or software module or logic. In alternative implementations, the functions noted in the blocks may occur out of the order noted in the figures, concurrently, etc.

The terms "computer program medium," "computer usable medium," "computer readable medium", and "computer program product," are used to generally refer to media such as main memory, secondary memory, removable storage drive, a hard disk installed in hard disk drive, and signals. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Computer program instructions may be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

As will be appreciated by one skilled in the art, aspects of the embodiments may be embodied as a system, method or computer program product. Accordingly, aspects of the embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program code for carrying out operations for aspects of one or more embodiments may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of one or more embodiments are described above with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the disclosed technology. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the embodiments has been presented for purposes of illustration and description, but is not intended to be exhaustive or limited to the embodiments in the form disclosed. Many modifications and variations will be apparent to those of ordinary skill in the art without departing from the scope and spirit of the disclosed technology.

Though the embodiments have been described with reference to certain versions thereof; however, other versions are possible. Therefore, the spirit and scope of the appended claims should not be limited to the description of the preferred versions contained herein.

What is claimed is:

1. A method comprising:

determining a first representation of a source gamut of an input content in a first two-dimensional device-independent color space;

determining a second representation of a target gamut of a display device in a second two-dimensional device-independent color space;

determining a color transition protection zone (TPZ) based on the source gamut and the target gamut, wherein the TPZ defines a color region inside both the source gamut and the target gamut, and the TPZ has one or more boundaries;

utilizing a color gamut mapping (CGM) module to perform, based on the one or more boundaries of the TPZ, linear color gamut compression from the first two-dimensional device-independent color space to the second two-dimensional device-independent color space if the target gamut is narrower than the source gamut; and utilizing the same CGM module to perform, based on the one or more boundaries of the TPZ, linear color gamut extension from the first two-dimensional device-independent color space to the second two-dimensional device-independent color space if the target gamut is wider than the source gamut.

2. The method of claim 1, wherein each of the first two-dimensional device-independent color space and the second two-dimensional device-independent color space comprises a perceptually non-uniform CIE 1931 XYZ color space.

3. The method of claim 1, wherein the TPZ is further based on criteria for preserving a perceptual color hue and for enabling the linear color gamut compression and the linear color gamut extension.

4. The method of claim 1, further comprising:

for each source color in the source gamut and outside the TPZ:

determining a color moving path for one of the linear color gamut compression or the linear color gamut extension, wherein the color moving path is based on at least one of the source color in the source gamut and an anchor point located on the one or more boundaries of the TPZ; and moving the source color in the source gamut along the color moving path to a target color in the target gamut.

5. The method of claim 1, wherein each source color in the source gamut and inside the TPZ is not moved.

6. The method of claim 1, further comprising:

determining offline a look-up table (LUT) for performing the linear color gamut compression and the linear color gamut extension;

performing online, via the CGM module, the linear color gamut compression utilizing the LUT if the target gamut is narrower than the source gamut; and performing online, via the CGM module, the linear color gamut extension utilizing the LUT if the target gamut is wider than the source gamut.

7. The method of claim 1, wherein the CGM module comprises a single hardware entity providing a universal framework for the linear color gamut compression and the linear color gamut extension.

8. A system comprising:

at least one processor; and a non-transitory processor-readable memory device storing instructions that when executed by the at least one processor causes the at least one processor to perform operations including:

determining a first representation of a source gamut of an input content in a first two-dimensional device-independent color space;

determining a second representation of a target gamut of a display device in a second two-dimensional device-independent color space;

determining a color transition protection zone (TPZ) based on the source gamut and the target gamut, wherein the TPZ defines a color region inside both the source gamut and the target gamut, and the TPZ has one or more boundaries;

utilizing a color gamut mapping (CGM) module to perform, based on the one or more boundaries of the TPZ, linear color gamut compression from the first two-dimensional device-independent color space to the second two-dimensional device-independent color space if the target gamut is narrower than the source gamut; and utilizing the same CGM module to perform, based on the one or more boundaries of the TPZ, linear color gamut extension from the first two-dimensional device-independent color space to the second two-dimensional device-independent color space if the target gamut is wider than the source gamut.

9. The system of claim 8, wherein each of the first two-dimensional device-independent color space and the second two-dimensional device-independent color space comprises a perceptually non-uniform CIE 1931 XYZ color space.

10. The system of claim 8, wherein the TPZ is further based on criteria for preserving a perceptual color hue and for enabling the linear color gamut compression and the linear color gamut extension.

11. The system of claim 8, wherein the operations further comprise:

for each source color in the source gamut and outside the TPZ:

determining a color moving path for one of the linear color gamut compression or the linear color gamut extension, wherein the color moving path is based on at least one of the source color in the source gamut and an anchor point located on the one or more boundaries of the TPZ; and moving the source color in the source gamut along the color moving path to a target color in the target gamut.

12. The system of claim 8, wherein each source color in the source gamut and inside the TPZ is not moved.

13. The system of claim 8, wherein the operations further comprise:

determining offline a look-up table (LUT) for performing the linear color gamut compression and the linear color gamut extension;

performing online, via the CGM module, the linear color gamut compression utilizing the LUT if the target gamut is narrower than the source gamut; and performing online, via the CGM module, the linear color gamut extension utilizing the LUT if the target gamut is wider than the source gamut.

14. The system of claim 8, wherein the CGM module comprises a single hardware entity providing a universal framework for the linear color gamut compression and the linear color gamut extension.

15. A non-transitory processor-readable medium that includes a program that when executed by a processor performs a method comprising:

determining a first representation of a source gamut of an input content in a first two-dimensional device-independent color space;

determining a second representation of a target gamut of a display device in a second two-dimensional device-independent color space;

determining a color transition protection zone (TPZ) based on the source gamut and the target gamut, wherein the TPZ defines a color region inside both the source gamut and the target gamut, and the TPZ has one or more boundaries;

utilizing a color gamut mapping (CGM) module to perform, based on the one or more boundaries of the TPZ, linear color gamut compression from the first two-dimensional device-independent color space to the second two-dimensional device-independent color space if the target gamut is narrower than the source gamut; and utilizing the same CGM module to perform, based on the one or more boundaries of the TPZ, linear color gamut extension from the first two-dimensional device-independent color space to the second two-dimensional device-independent color space if the target gamut is wider than the source gamut.

16. The non-transitory processor-readable medium of claim 15, wherein each of the first two-dimensional device-independent color space and the second two-dimensional device-independent color space comprises a perceptually non-uniform CIE 1931 XYZ color space.

17. The non-transitory processor-readable medium of claim 15, wherein the TPZ is further based on criteria for preserving a perceptual color hue and for enabling the linear color gamut compression and the linear color gamut extension.

18. The non-transitory processor-readable medium of claim 15, wherein the method further comprises:

for each source color in the source gamut and outside the TPZ:

determining a color moving path for one of the linear color gamut compression or the linear color gamut extension, wherein the color moving path is based on at least one of the source color in the source gamut and an anchor point located on the one or more boundaries of the TPZ; and moving the source color in the source gamut along the color moving path to a target color in the target gamut.

19. The non-transitory processor-readable medium of claim 15, wherein each source color in the source gamut and inside the TPZ is not moved.

20. The non-transitory processor-readable medium of claim 15, wherein the method further comprises:

determining offline a look-up table (LUT) for performing the linear color gamut compression and the linear color gamut extension;

performing online, via the CGM module, the linear color gamut compression utilizing the LUT if the target gamut is narrower than the source gamut; and performing online, via the CGM module, the linear color gamut extension utilizing the LUT if the target gamut is wider than the source gamut.

* * * * *